United States Patent [19]

Matsumoto

[11] Patent Number: 4,864,149
[45] Date of Patent: Sep. 5, 1989

[54] METHOD OF DETECTING FRAME EDGE

[75] Inventor: Fumio Matsumoto, Tokyo, Japan

[73] Assignee: Fuji Photo Film Co., Ltd., Kanagawa, Japan

[21] Appl. No.: 137,295

[22] Filed: Dec. 23, 1987

[30] Foreign Application Priority Data

Dec. 26, 1986 [JP] Japan .............................. 61-313738
Feb. 2, 1987 [JP] Japan .............................. 62-22070

[51] Int. Cl.⁴ .................... G01N 21/86; G03B 23/12
[52] U.S. Cl. ................................ 250/561; 250/570; 353/26 A; 355/41
[58] Field of Search ............. 353/26 A, 26 R; 355/41, 355/68; 250/570, 561, 560; 356/444, 443; 358/215, 214

[56] References Cited

U.S. PATENT DOCUMENTS

| | | | |
|---|---|---|---|
| 3,778,630 | 12/1973 | White et al. | 353/26 A |
| 3,809,910 | 5/1974 | Nellis | 353/26 A |
| 3,881,820 | 5/1975 | Muir | 355/41 |
| 4,453,823 | 6/1984 | Sugita et al. | 353/26 A |
| 4,691,112 | 9/1987 | Wydler | 353/26 A |

FOREIGN PATENT DOCUMENTS 2701088 7/1978 Fed. Rep. of Germany ........ 355/41

Primary Examiner—David C. Nelms
Assistant Examiner—Michael Messinger
Attorney, Agent, or Firm—Sughrue, Mion, Zinn, Macpeak & Seas

[57] ABSTRACT

A method of detecting a frame edge of a film by a first group of light-receiving element arrays and a second group of light-receiving element arrays, each of the groups being composed of at least one array of light-receiving elements disposed perpendicular to the advancing direction of the film in such a manner as to be parallel with each other. The presence of a frame edge is preliminarily detected by the first group of light-receiving element arrays, and the position of the frame edge is precision-detected by the second group of light-receiving element arrays. Accordingly, since the precision detetction is effected after preliminary detection, the range of precision detection can be narrowed, thereby shortening the detection time.

18 Claims, 16 Drawing Sheets

F I G. 3
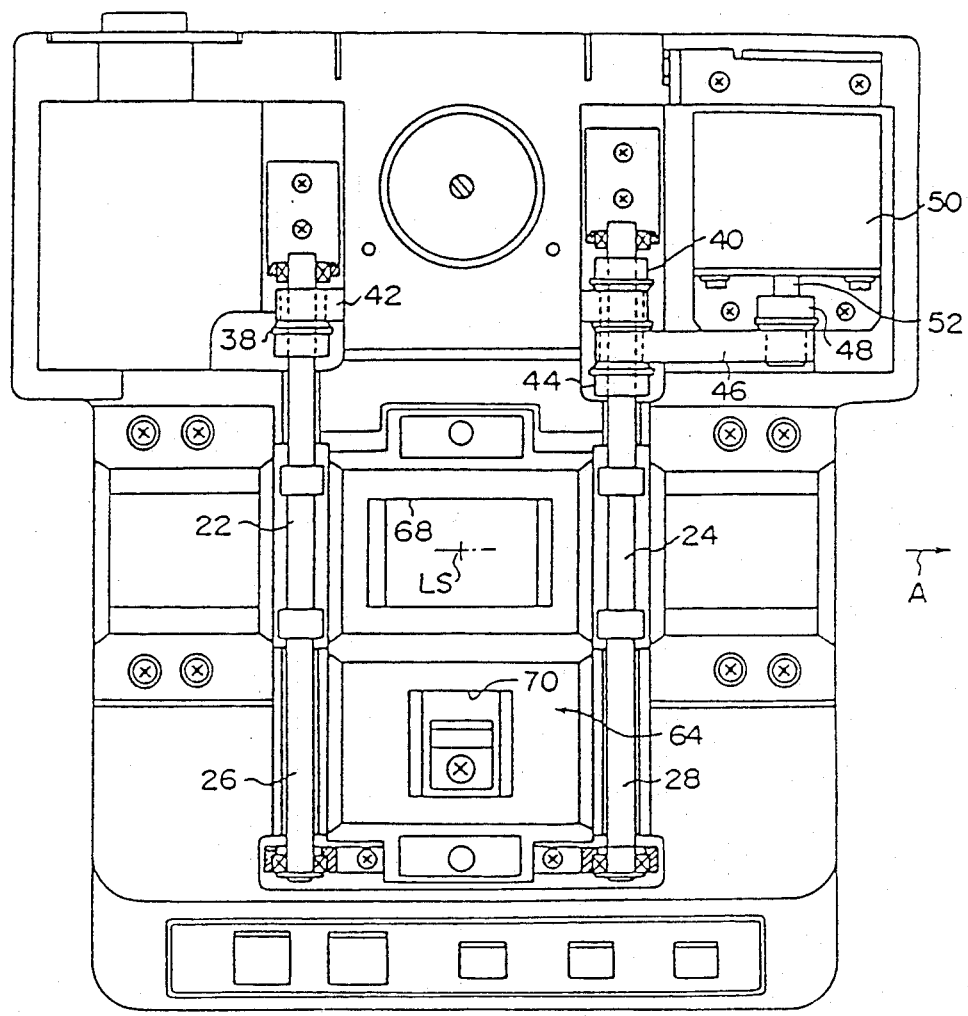

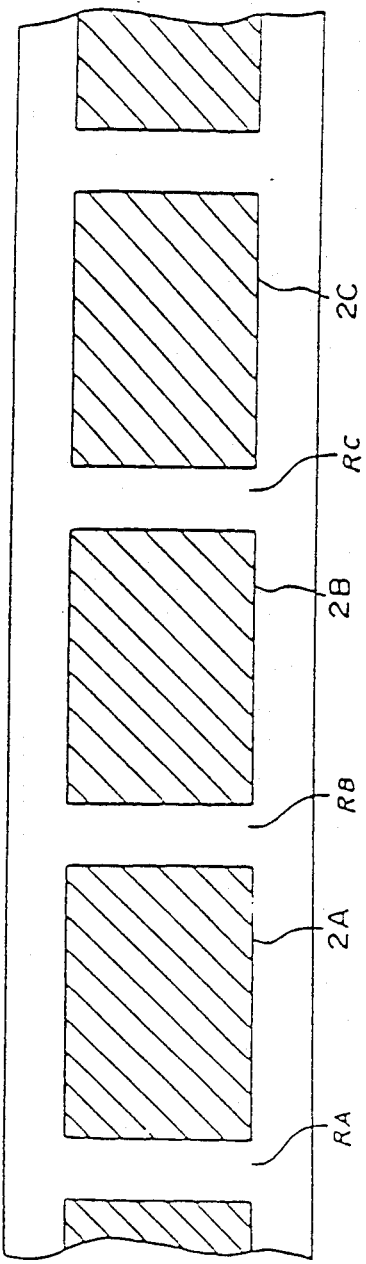

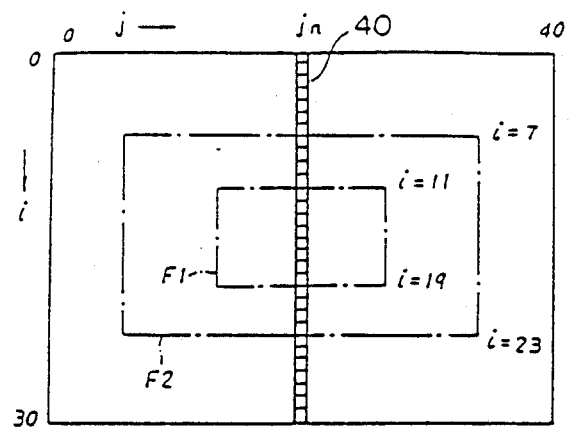
FIG. 13 (1)
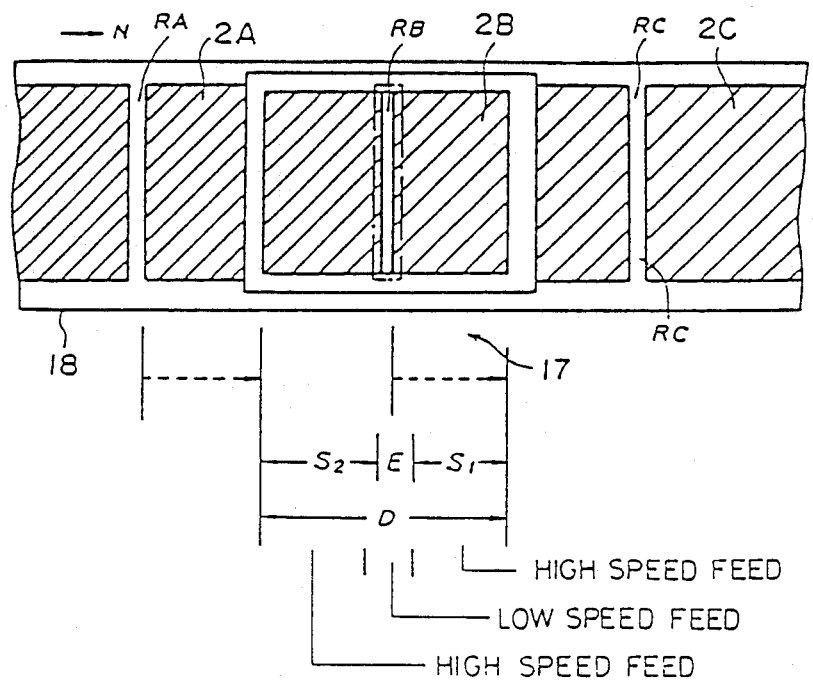
FIG. 13 (2)

FIG. 16

|     | #1  | #2  | #3  | #4  | #5  | #6  | #7  | #8  | #9  | #10  |
|-----|-----|-----|-----|-----|-----|-----|-----|-----|-----|------|
| $M_1$ | M11 | M12 | M13 | M14 | M15 | M16 | M17 | M18 | M19 | M110 |
| $M_2$ | M21 | M22 | M23 | M24 | M25 | M26 | M27 | M28 | M29 | M210 |

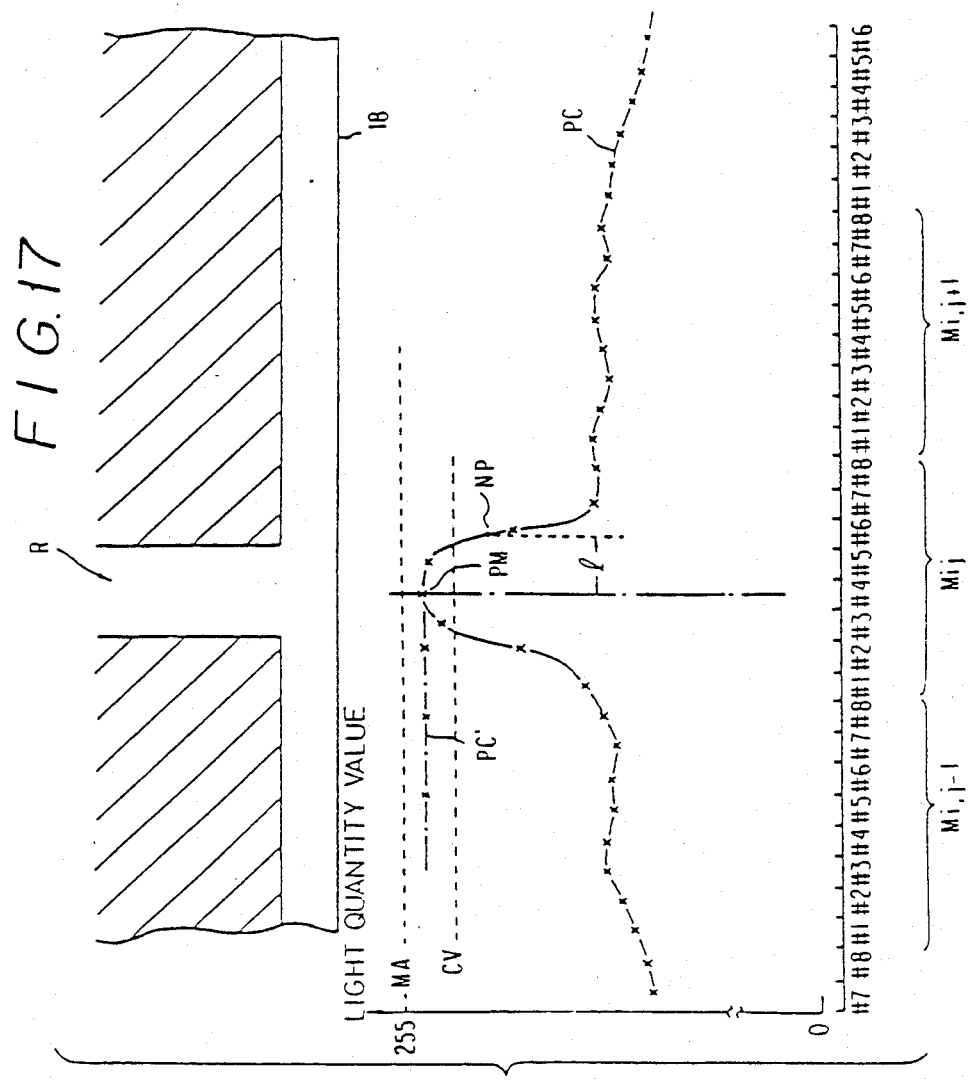

METHOD OF DETECTING FRAME EDGE

BACKGROUND OF THE INVENTION

1. Field of the Invention

The present invention relates to a method of detecting a frame edge, and more particularly to efficiently and speedily detecting an edge of a photographed frame (i.e., a boundary with a film base) at the time of printing an image from an original film, such as a negative film.

2. Statement of the Related Art

Hitherto, automatic photographic color printing apparatuses have been known in which printing is effected in such a manner that the density of all the finished prints and the color balance become identical regardless of the light and shade of a negative (i.e., underexposure, adequate exposure, and overexposure) by measuring the large area transmittance density (LATD) of the overall images of a color negative film (i.e., an original film) to compensate for the density and by effecting slope control. This automatic photographic printing apparatus is arranged by sequentially disposing an optical system provided with a light source, a light-adjusting filter, a mirror box, a negative carrier, a lens, and a black shutter. After the original film is placed on the negative carrier, the light source is lit, and the black shutter is then opened to allow an image of the original film to be formed on photographic paper via the lens, thereby effecting printing. The printed photographic paper is developed in a development process, and prints are automatically finished. In this automatic photographic printing apparatus, the light generated from the light source and transmitted through the original image is decomposed into the primaries of red light (R), green light (G), and blue light (B). An LATD is measured separately for each of R, G, and B to determine an amount of printing light on the basis of the principle of Evans. At the same time, slope control is carried out to compensate for reciprocity law failure, and the density of prints and color balance are thereby controlled.

In addition, in automatic photographic printing apparatuses, it is necessary to accurately position the frames of the original film on the printing apparatus in order to properly print frame images of the original film on photographic paper. To effect this positioning automatically, a notch is conventionally provided in a side end portion of each frame of the original film by using a notcher in a preceding process, and the notch is detected by a photosensor or the like to effect positioning. However, at the time of providing the notch, it is necessary to make the notch correspond to the frame accurately, so that there has been a drawback in that much labor is required. Furthermore, there is another method whereby positioning is effected by feeding the original film constantly by a fixed amount, i.e., a fixed distance. With this method, however, accuracy is poor since the misalignment at the time of film feeding for printing is accumulated, so that there is a drawback in that this method is not suitable for automatic processing.

To solve these problems, the present applicant has already proposed a method of automatically positioning the frame of a film at a printing position by obtaining high-resolution image information by determining data between adjacent picture elements by interpolation using an exposure-controlling two-dimensional image sensor having a relatively coarse image-element density, whereby a frame edge is detected accurately, and the frame of the film is automatically positioned at a printing position. In this method, an output of a picture element array is detected by pitches that are relatively smaller than the picture-element pitches of the two-dimensional image sensor, and the frame edge is detected by a statistical technique using a frequency distribution of interpolated variables. Accordingly to this method, if a leading frame closest to a film edge is positioned in advance at the time of setting a negative film for printing on a negative carrier, since the lengths of the frames and frame intervals are substantially fixed thereafter, the negative film frames can be automatically positioned without any problems in practical use, with the exception of the positioning work for the leading frame, by feeding the negative film by a predetermined amount and detecting the edge of the next frame within a predetermined range of detection, thereby effecting positioning. In the case of an elongated negative (strip negative), the leading frame which is subject to printing is generally located at a position removed from a leading edge portion of the negative film, and, if the edge of the leading frame is detected using the aforementioned method, the edge of the leading frame is precision-detected with pitches that are smaller than the picture element pitches. Consequently, it is necessary to fetch data continuously from the leading edge portion of the negative film with pitches that are smaller than the picture element pitches and to effect arithmetic processing so as to detect the position of the frame edge. Consequently, the range of precisely detecting the position of the leading frame is wide, so that a large amount of time for fetching data and processing time are required. Hence, there is a drawback in that the film cannot be conveyed at high speed, and the frame edge cannot be detected efficiently. In the case of a short (piece) negative as well, there are cases where the position of the leading frame is located in the same way as the elongated negative (a piece negative which is cut including the leading portion of the elongated negative) and cases where the position of the leading frame is adjacent to a film edge. In both cases, with the method of detecting the frame edge using a statistical method which uses the leading frame position as a reference, there is a drawback in that it is difficult to automatically discriminate these negatives. In addition, since the leading end portion of the negative film must be positioned manually to avoid these drawbacks, the efficiency becomes poor. Hence, in any case, there is the problem of causing a hindrance to automation.

SUMMARY OF THE INVENTION

Accordingly, an object of the present invention is to enhance the practicability and versatility of the above-described positioning method proposed by the present applicant, i.e., to provide a method of detecting a frame edge which makes it possible to feed a film at high speed as a whole by feeding the film at high speed at a portion of the film in the vicinity of the range of precision detection by making narrow the range of precision detection of the frame edge position by fine-pitch film feeding in relation to preliminary detection, in such a manner that automatic positioning can be effected efficiently with respect to a leading frame irrespective of an elongated negative film and a short negative film, thereby overcoming the drawbacks of the prior art.

To this end, according to the present invention, there is provided a method of detecting a frame edge of a film fed by first and second groups of light-receiving element arrays, the first group of light-receiving element arrays being composed of at least one array extending perpendicularly of an advancing direction of the film, the second group of light-receiving element arrays being composed of at least one array extending in the same direction as that of the first group of light-receiving element arrays in such a manner as to be parallel with the first group of light-receiving element arrays, comprising the steps of: (a) preliminarily detecting the presence of the frame edge by the first group of light-receiving element arrays; and (b) precision-detecting the position of the frame edge by the second group of light-receiving element arrays after preliminary detection of the frame edge.

According to the present invention, the presence of a frame edge is detected preliminarily by the first group of light-receiving element arrays, and the position of the frame edge is precision-detected by the second group of light-receiving element arrays. Thus, since the presence of the frame edge is detected preliminarily, the range of precision detection of the frame edge can be restricted to a small range. Consequently, the film can be fed at high speed in each stage: during the time until the frame is detected preliminarily, during the period of the preliminary detection range, during the interval of the first group of light-receiving element arrays and the second group of light-receiving element arrays, i.e., from the time when the presence of the frame edge is detected until the period of the range of precision detection, and after the precision detection. Thus, in the present invention, since the position of the frame edge is detected after preliminarily detecting the presence of the frame edge, even if a sensor with a coarse picture-element density is used, it is not necessary to detect the position of the frame edge constantly with pitches smaller than the picture element pitches, and it suffices to detect only a limited range of precision detection with pitches smaller than picture element pitches. Hence, it is possible to shorten the overall detection time consisting of the time required for fetching data and the operation time. In addition, since the first group of light-receiving element arrays is used to detect only the presence of the frame edge, i.e., whether or not the frame edge is in a fixed range of distance, so that the density of the picture elements may be coarse. In addition, the film can be fed with, for instance, single-picture-element pitches until the presence of the frame edge is detected. Incidentally, if the resolution of the first group of light-receiving element arrays is high, detection can be effected with plural-picture-element pitches, and this arrangement further improves the efficiency. Meanwhile, the second group of light-receiving element arrays is used to detect the position of the frame edge with an accuracy higher than that of the first group of light-receiving element arrays, if a sensor having a coarse picture element density is used, detection is carried out with pitches that are smaller than the single picture-element pitches. Incidentally, if the resolution of the second group of light-receiving element arrays is high, detection may be effected with single-picture-element pitches.

As has been described above, in accordance with the present invention, since the position of the frame edge is precision-detected after the position of the frame position is estimated by preliminarily detecting the presence of the frame edge, the range of precision detection of the frame edge can be limited to a narrow range, thereby shortening the detection time. As a result, it is possible to obtain an advantage in that the speed of film feeding can be increased as a whole, since the film can be fed at a relatively high speed, as compared with precision detection of the frame edge position, with respect to each stage: until the presence of the frame edge is detected preliminarily, during the period of the preliminary detection range, during the movement between the two groups of light-receiving element arrays, and after precision detection. In other words, the speed of film feeding can be increased efficiently since the proportion of the range of preliminary detection in which medium- to high-speed feeding is carried out with single- or plural-picture-element pitches and the range of nondetection in which high-speed feeding is carried out without detecting the frame edge is relatively higher than that of the range of precision detection in which low-speed feeding is carried out with fine picture-element pitches.

The above and other objects, features, and advantages of the present invention will become apparent from the following detailed description of the invention when read in conjunction with the accompanying drawings.

BRIEF DESCRIPTION OF THE DRAWINGS

FIG. 3 is a film feeding apparatus with a large arm, a small arm, and so forth removed;

FIG. 12 is a memory diagram illustrating an example of image information;

FIG. 13(1) is a diagram illustrating a range of use of a group of light-receiving element arrays;

FIG. 13(2) is a diagram illustrating a mask opening of a film feeder;

FIGS. 15 and 16 are diagrams explaining the relationships between data on image-element arrays and the storage into memories; and FIG. 17 is a diagram illustrating relationships between a negative film and detected data on memories.

DESCRIPTION OF THE PREFERRED EMBODIMENT

Figure 1:
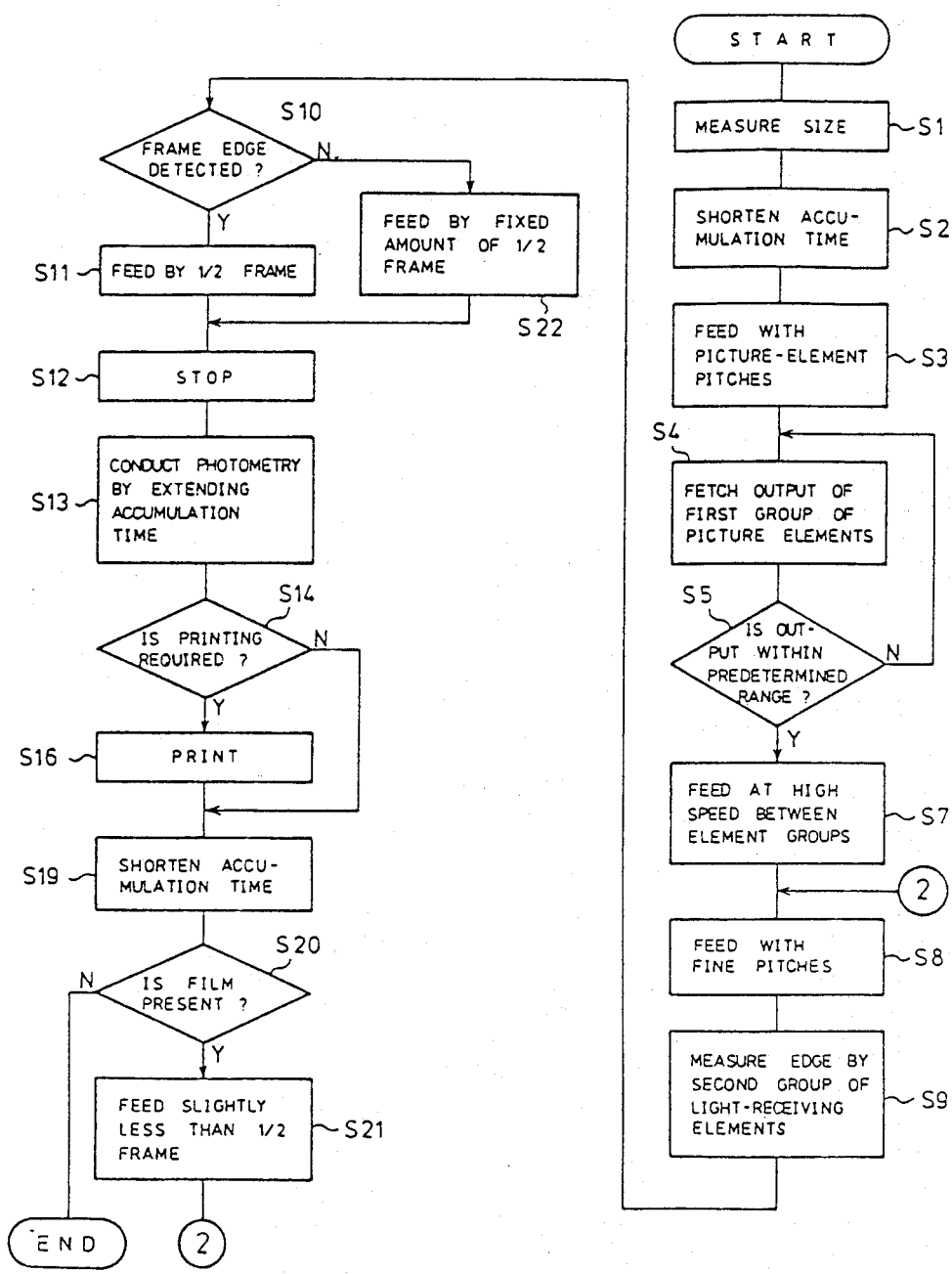
FIG. 1 is a flowchart illustrating a film feeding routine in accordance with an embodiment of the present invention.

Before giving a detailed description of a preferred embodiment of the present invention, a description will be made hereafter of forms which the present invention is capable of adopting.

A first form is a case where the present invention is applied to the detection of an edge of a leading frame of a typical piece negative for which it is confirmed that the edge of the leading frame exists in the vicinity of a film edge. In the preliminary detection, the confirmation of only the presence of the film edge is carried out. In other words, in the first form, at the time of detecting the edge of the leading frame of a piece negative which does not include a leading edge portion of an elongated negative, the presence of the edge of the leading frame is preliminarily detecting by detecting the presence of the film edge by a first group of light-receiving element arrays, and the position of the edge of the leading frame is detected precisely by a second group of light-receiving element arrays after the presence of the edge of the leading frame has been detected.

In the case of a piece negative in which an elongated negative (strip negative) is cut into units of a predetermined number of frames (e.g., six-frame units or four-frame units), with the exception of a piece negative corresponding to a leading edge portion of the elongated negative (due to the presence of fogging or blindly exposed frames in this piece negative), a distance between the film edge and a frame edge (i.e., the edge of the leading frame) closest to this film edge is approximately 1 mm, so that a proportion of this distance to the overall length of the piece negative (about 152 mm (38 mm×4) in the case of four frames, and 228 mm (38 mm×6) in the case of six frames) is small. Therefore, it can be considered that the position of the film edge and the edge of the leading frame closest to the film edge are substantially are equal. Hence, by detecting the presence of the film edge, it can be considered that the presence of the edge of the leading frame has been preliminarily detected. As such, in this form, the film is fed at high speed up to the position of the second group of light-receiving element arrays after the preliminary detection of the presence of the leading frame edge from the presence of the film edge. The position of the leading frame edge is detected precisely by the second group of light-receiving element arrays. The presence of the film edge can be detected readily by determining whether or not an output of the first group of light-receiving element arrays has changed to the high-density side at least by a portion of a film base density using an unloaded state of the film as a reference.

By thus preliminarily detecting the presence of the leading frame edge from the presence of the film edge, if the piece negative is inserted into a film feeder with the film feeder driven, for instance, the presence of the leading frame edge can be preliminarily detected by the detection of the presence of the film edge. Subsequently, the position of the leading frame edge can be detected precisely by, for instance a predetermined method (picture-element pitch interpolation, or the like) which will be described later, and the leading frame can be thereby stopped at a predetermined position. Therefore, it is possible to automatically position the leading frame closest to the film edge of the piece negative.

According to this form, therefore, it is possible to obtain advantages in that the overall speed of the film feeding can be increased, and that the leading frame closest to the film edge of the piece negative can be automatically positioned efficiently.

A second form is substantially similar to the first form, but the practicality of the first form is further enhanced. Specifically, the range of precision detection can be restricted further by confirming both the film edge and the leading frame edge in preliminary detection. In other words, in the second form, at the time of further enhancing the efficiency of automation in the first form, determination is made as to whether or not an output of the first group of light-receiving elements has changed further to the high-density side within a predetermined range of distance and a predetermined range of density by using as a reference a position at which an output of the first light-receiving element arrays has changed to the high-density side, thereby preliminarily detecting the presence of the leading frame edge. After the presence of the leading frame edge has been preliminarily detected, the position of the leading frame edge is detected precisely by the second group of light-receiving element arrays.

According to the first form, in the case of a piece negative which does not include the leading end portion of an elongated negative, the edge of the leading frame is preliminarily detected by assuming that the film edge and the leading frame edge are substantially identical. In this form, however, the presence of the leading frame is actually detected preliminarily. Namely, the presence of the leading frame edge is preliminary detected by determining whether or not an output of the first group of light-receiving element arrays has changed further to the high-density side within a predetermined range of distance (e.g., a length from the film edge of the piece negative to the edge of the leading frame closest to this film edge (a maximum distance or time for feeding about a maximum of 4–5 mm or thereabout)) and within a predetermined range of density. In short, in the case of the piece negative which does not include the leading end portion of the elongated negative, the distance from the film edge to the leading frame edge is normally short, and the density of a frame image portion is higher than that of a negative base portion. Accordingly, when the base portion is detected by the first group of light-receiving element arrays, an output of the first group of light-receiving element arrays changes to the high-density side. From this point of time, the frame image portion is detected within the predetermined range of distance, and the output further changes to the high-density side within the predetermined range of density. Incidentally, there are cases where the film is cut by biting the image of the leading image, making the film edge and the leading frame edge identical. In this case, the aforementioned predetermined distance becomes zero. Accordingly, by detecting whether or not an output of the first group of light-receiving element arrays has changed to the high-density side within the predetermined range of distance and the predetermined range of density, it is possible to detect the edge of the leading frame which is the closest to the film edge. Subsequently, the edge of the leading frame is detected precisely by the second group of light-receiving element arrays in the same manner as that of the first form.

According to this form, since the leading frame edge is actually detected preliminarily, it is possible to obtain advantages in that the detection of the leading frame edge is done more positively, that practicality is increased, and that the overall detection time can be shortened in comparison with the first form.

In the above, description has been given of a piece negative which does not include the leading end portion of an elongated negative, i.e., a piece negative for which the frequency of occurrence of fogging at a leading end portion of the film and blind exposure is small. Generally, however, since a film withdrawn from a patrone is loaded in a camera at the time of shooting, fogging caused by complete exposure to the external light occurs to the leading end portion of the elongated negative and a piece negative including the leading end portion of the elongated negative. In addition, even in a piece negative which does not include the leading end portion of the elongated negative, there are cases where the film is cut with the film edge and the frame edge coinciding with each other. Accordingly, in a third form, the classification of the aforementioned forms of film (strip negative, piece negative, etc.) is not carried out manually, but the leading frame edges of all the films including elongated negatives and piece negatives which do not include the leading end portions of the elongated negatives (including piece negatives in which film edges and the frame edges coincide with each other) are automatically detected efficiently, thereby remarkably enhancing the versatility and practicality.

Namely, according to the third form, the presence of the leading frame edge is preliminarily detected by detecting a point of time when an output of the first group of light-receiving element arrays has reached a value between the film base density and the fogging density is detected. After the preliminary detection of the presence of the leading frame edge, the position of the leading frame edge is detected precisely by the second group of light-receiving element arrays.

The portions of the film base are unexposed portions, and can be regarded to have substantially the same density with respect to all negatives. In addition, as for a fogged portion, its density is substantially uniform and very high as a whole when compared with that of a usually overexposed frame image, and low-density portions and high-density portions are not mixed unlike in the case of general frame image information. Accordingly, a value between the density of a film base portion and the fogging density is taken as the density of the frame image, and by detecting a point of change where an output of the first group of light-receiving element array reaches a value between the film base density and the fogging density, the presence of the leading frame edge can be preliminarily detected. Incidentally, discrimination between the fogging density and the general image density may be effected by jointly using contrast information, minimum density information, etc. This case is particularly effective in cases where the accumulation time of the image sensor, which will be described later, is short (cases where information on the super-high density-side is saturated).

As described above, according to the third form, it is possible to obtain an advantage in that the edge of the leading frame closest to the film edge can be automatically positioned efficiently without any need to manually classify the forms of film. Accordingly, the third form has the greatest versatility and practicality as compared with the first and second forms.

Furthermore, in a fourth form, at the time of detecting the presence of a film edge or the leading frame edge by using at least one particular array of light-receiving elements of a first group of light-receiving element arrays and a second group of light-receiving element arrays together constituting an exposure-controlling two-dimensional image sensor, said light-receiving element arrays extending perpendicularly of an advancing direction of the film, the sensitivity is relatively lowered in comparison with a case where exposure-controlling image information is detected by the two-dimensional image sensor.

The dynamic range of the two-dimensional image sensor is narrower than that of usual photoelectric conversion elements such as photodiodes and photoelectric tubes, and the frame image information mainly exists on the high-density side of the negative film. Therefore, if a two-dimensional image sensor for photometry of frame image information proposed by the present applicant in Japanese Patent Laid-Open No. 154244/1985, the dynamic range of the image sensor is set in such a manner that a reference density of the film base, which is the minimum density of the image, becomes zero. Subsequently, a reciprocal number of an output of the image sensor is subjected to logarithmic transformation in accordance with the formula given below so as to relatively compress the information on the low-density side, and, at the same time, the information on the high-density side is expanded, whereby the processing of image information for exposure control or exposure compensation is effected.

$$D = \log_{10} \frac{1}{T}$$

where D is density, and T is transmittance.

Accordingly, if an attempt is made to detect the edge of the film edge or the leading frame edge using the exposure-controlling two-dimensional image sensor whose dynamic range is thus set, since the information of the low-density side corresponding to the vicinity of the film base is saturated and compressed, resolution is deteriorated, making it difficult to detect the density lower than the film base density, i.e., the presence or absence of the film. For this reason, in this form, in a case where the presence of the film edge or the leading frame edge is detected using the exposure-controlling two-dimensional image sensor, the sensitivity is relatively lowered than in the case of detecting the exposure-controlling image information by the two-dimensional image sensor. The lowering of the sensitivity can be attained by reducing the quantity of light from the light source, or by shortening the accumulation time of the two-dimensional image sensor, thereby changing over the sensitivity of the two-dimensional image sensor. If the dynamic range is set in such a manner that the reference density becomes zero when, for instance, the film is not present and only the light source is lit, the detection of the film edge and the leading frame edge can be facilitated by thus changing over the sensitivity, without causing the low-density-side information to become saturated. Incidentally, when the film edge and the leading frame edge are detected, since image information corresponding to the low-density side in the vicinity of the film base density becomes essential, the presence of the film edge and the like may be detected by directly using an output of the image sensor (corresponding to transmittance) converted by an A/D converter. Alternatively, a corresponding lookup table may be changed over to obtain a density value. Incidentally, in the embodiment given below, description is given of an example in which lookup tables are used.

According to this mode, since the two-dimensional image sensor for detecting the exposure-controlling image information is used for edge detection, it is possible to obtain the advantages that it is unnecessary to add a sensor for edge detection, the space for installing the sensor can be saved, and the cost of the sensor can be reduced. Furthermore, if the accumulation time is shortened, unnecessary signals such as blooming and smear peculiar to an image sensor can be reduced, thereby advantageously enhancing the accuracy of edge detection. Moreover, since the accumulation time of the sensor can be reduced, the detection time can be shortened, which in turn allows the entire processing time to be shortened.

Referring now to the accompanying drawings, a description will be made of an embodiment of the present invention.

Figure 2:
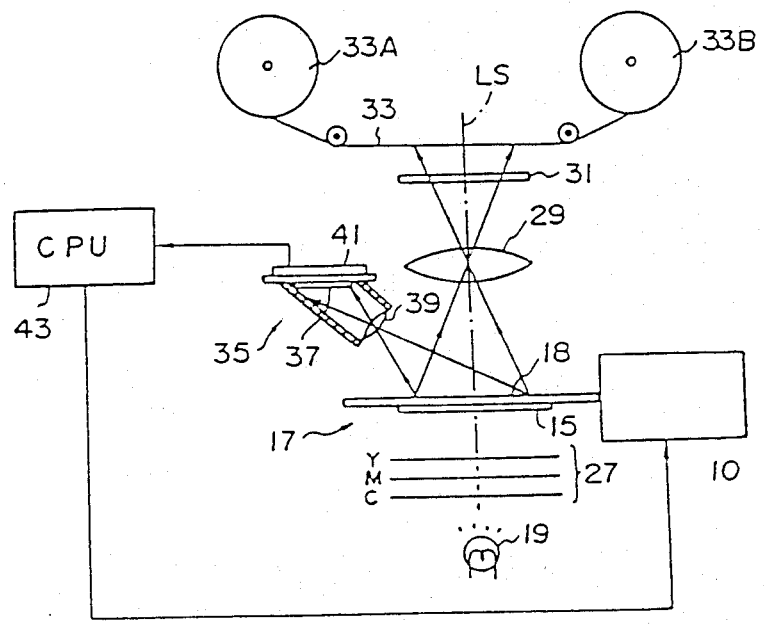
FIG. 2 is a schematic diagram of an optical printing system portion in accordance with the above-described embodiment.

FIG. 2 is a diagram schematically illustrating an optical printing system of an automatic photographic printing apparatus in accordance with the present invention. A film feeder 10 feeds a processed original film 18, such as a negative film, to a predetermined printing position 17 on a film support (negative carrier) 15. A light source 19 for printing is located below the printing position 17, and a light-adjusting filter 27 constituted by supplementary filters of yellow (Y), magenta (M), and cyan (C) are disposed between the film 18 and the light source 19 A portion of the film support 15 corresponding to a photographed area of the film is open or transparent. Elongated photographic paper 33 is disposed above the film 18 via a printing lens 29 and a shutter 31. Reference numeral 33A denotes a supply roll of the photographic paper 33, while numeral 33B denotes a takeup roll therefor. LS denotes an optical axis for printing.

An image information detecting device 35 for obtaining the density distribution of the film 18 at the printing position 17 is disposed in the vicinity of the printing position by forming a predetermined angle with the optical axis LS in such a manner as not to hamper the printing on the photographic paper 33. This image information detecting device 35 comprises: a two-dimensional image sensor 37 constituted by an accumulation-type photoelectric conversion element of such as the CCD or MOS type; a lens 39 for causing a film image at the printing position 17 to be formed at the image sensor 37; and a circuit for forming a light-amount signal from the printing position by electronically processing an output of the image sensor 37. The image sensor 37 receives the light transmitted through the original image of the negative film 18 located at the printing position 17, and outputs light-amount information from the printing position 17 to a multiplicity of aligned picture elements by dividing the transmitted light. In addition, the circuit 41 is connected to the CPU 43, which is connected to a pulse motor of the film feeder 10 so as to control the feeding speed.

The original film 18 is consecutively fed by each frame to the printing position 17 by the film feeder 10, and the film feeder 10 is arranged as described below.

[Film Feeder]

Figure 4:
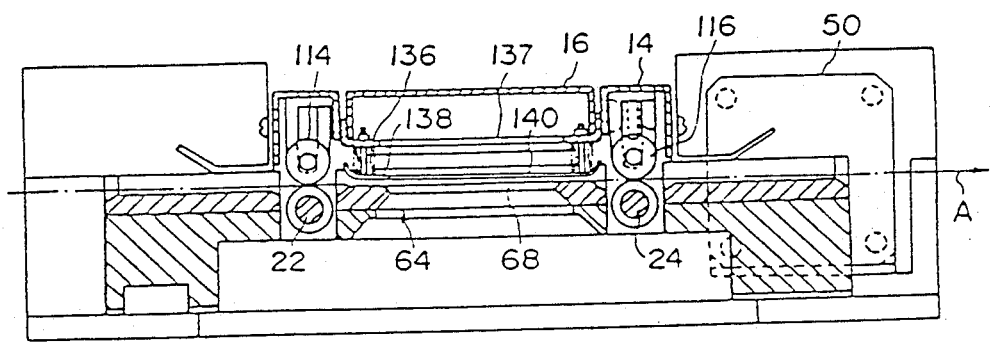
FIG. 4 is a cross-sectional view of a film feeding apparatus.

As shown in FIGS. 3 and 4, feed rollers 22, 24 are disposed on the upstream and downstream sides of the optical axis LS, respectively, in such a manner as to correspond to the reverse side (underside) of a negative film which is fed. These feed rollers 22, 24 are respectively secured to rotary shafts 26, 28, and are disposed perpendicularly to a film feeding path A, as viewed in a planar manner.

Pulleys 38, 40 are respectively secured to the feed rollers 22, 24, and a timing belt 42 is trained between these pulleys 38, 40. As a result, the rotary shafts 26, 28 are adapted to be rotated in the same rotating direction, as viewed in the axial direction, and at the same number of revolutions.

A pulley 44 is secured between the pulley 40 and the feed roller 24, and a part of a timing belt 46 is wound around it. The other portion of this timing belt 46 is wound around a pulley 48, which is connected to an output shaft 52 of a pulse motor whose number of driving pulses is controlled by the CPU 43. Consequently, the pulse motor 50 transmits its rotational force to the rotary shafts 26, 28 via the timing belts 46, 42, which in turn rotate the feed rollers 22, 24 clockwise as viewed in FIG. 4, thereby imparting a feeding force to the negative film on the film feeding path A.

A lower mask 64 is mounted below the film feeding path A, as shown in FIG. 3. A first mask opening 68 and a second mask opening 70 respectively penetrate this lower mask 64.

In addition, a large arm 14 is provided with a pair of press rollers 114, 116, which are adapted to clamp the negative film between the same and the feed rollers 22, 24, and to be capable of feeding the negative film when the feed rollers 22, 24 rotate. A mask base 136 is secured to a tip of a small arm 16. An opening 137 which is larger than a mask opening 140 is formed in this mask base 136, and an upper mask 138 is mounted thereon.

[Change-over of Sensitivity of Image Sensor]

Figure 5:
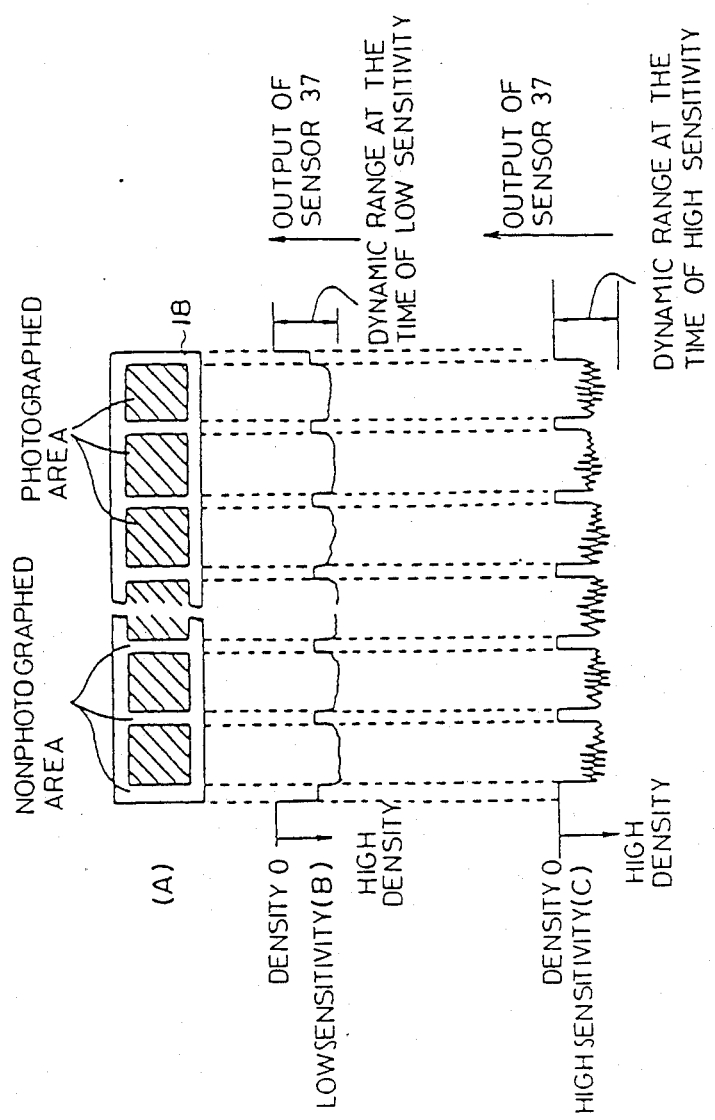
FIG. 5 is a diagram illustrating an average output of an image sensor along a longitudinal direction of the film.

When the film 18 is fed along the feeding path A, average (or integrated) outputs, i.e., anti-logarithms, from a plurality of light-receiving elements selected in accordance with the size of the negative among picture element arrays of the image sensor 37 in a direction perpendicular to the film feeding direction are shown in FIG. 5. FIG. 5(A) shows a top plan view of the film 18. FIG. 5(B) illustrates the outputs obtained when the dynamic range is made CDR shown in FIG. 8 by operating the image sensor 37 with low optical sensitivity. FIG. 5(C) shows the outputs obtained when the dynamic range is made FDR shown in FIG. 8 by operating the image sensor 37 with high optical sensitivity. As can be seen from FIG. 5(B), in a case where the image sensor is operated with low sensitivity, if, for instance, the brightness of the light source in a state in which the film is not present is set as a zero reference density, outputs of the sensor on the high-density side, i.e., the portion of the image frame, are in a saturated condition. On the low-density side, however, outputs vary substantially in a film edge portion and a frame edge portion. From these variations, it is possible to detect the presence of the film edge and the position of the frame edge. Meanwhile, as can be seen from FIG. 5(C), if the image sensor is operated with high sensitivity, i.e., when the film base density is set as the zero reference density, image information on the high-density side is obtained with good accuracy, but the sensor outputs on the low-density side are in a saturated state. Accordingly, when the image sensor is operated with high sensitivity, it becomes difficult to detect the film edge. In addition, as can be seen from FIG. 5(C), the frame edge can be detected with respect to specific frame images even if the image sensor is operated with high sensitivity. However, frame images of an underexposed negative film and a negative film, in which a distribution rate of low-density portions is large and for which the frame edge detection is generally difficult, have a density of a level equivalent to the film base, it is undesirable to detect the frame edge by operating the image sensor with high sensitivity, since the detection would otherwise become difficult.

Figure 6:
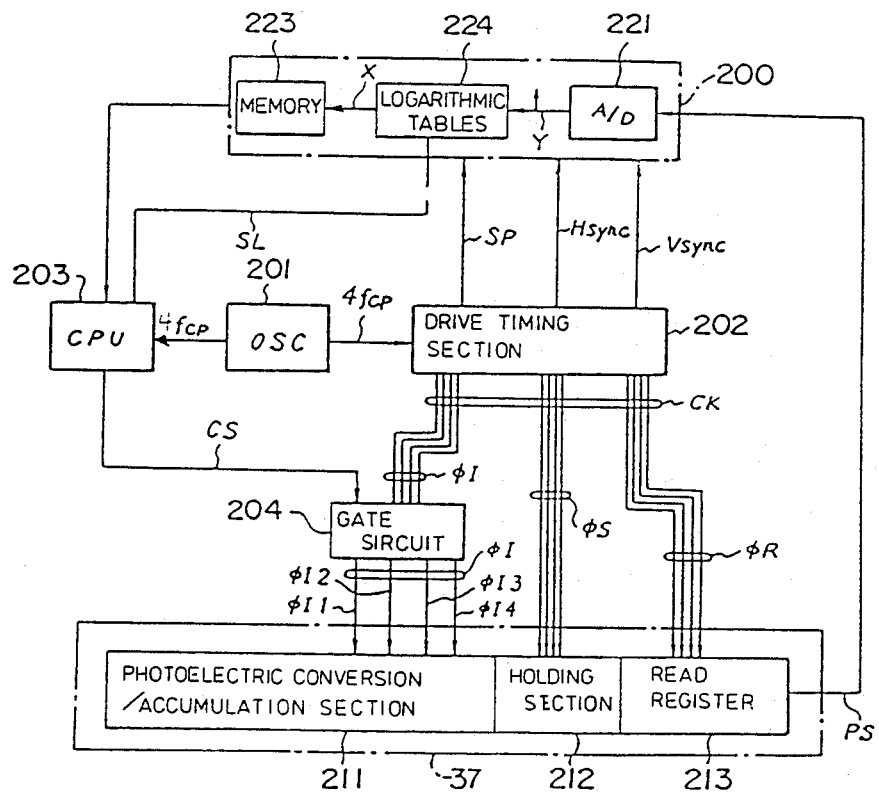
FIG. 6 is a block diagram illustrating an example of a drive system for the image sensor.

(1) First, description will be made of a case where sensitivity is changed over by changing the accumulating time of the image sensor. FIG. 6 shows the details of the circuit 41 shown in FIG. 2 as well as the details of the image sensor 37 within a block indicated by an alternate long and short dash line. The image sensor 37 comprises a photoelectric conversion/accumulation section 211 which, upon receiving light of an image or the like, effects photoelectric conversion and accumulation of charges; a holding section to which the charges accumulated in the photoelectric conversion/accumulation section 211 are transmitted and which holds the same; and a read register 213 which outputs the charged held by the holding section 212 as an image signal PS. In addition, a pulse oscillator 201 generates a basic clock 4fcp of a predetermined frequency (e.g. 6 MHz), and this basic clock 4fcp is input to a drive timing section 202 and a CPU 203, clock signals CK ($\Phi$I, $\Phi$S, $\Phi$R) for driving the image sensor 37 are generated from drive timing section 202, and a signal representing the operating status of the image sensor 37, i.e., an image signal PS corresponding to one picture element of the image sensor 37, a horizontal synchronizing signal Hsync corresponding to the scanning of one line by the image sensor 37, and a vertical synchronizing signal Vsync corresponding to the scanning of one image plane by the image sensor 37 are generated and output. The clock signals CK input to the image sensor 37 are constituted by, for instance, four-phase signals $\Phi$I ($\Phi$I1–$\Phi$I4) for driving the photoelectric conversion/accumulation section 211; for instance, four-phase signal $\Phi$S ($\Phi$S1–$\Phi$S4) for driving the holding section 212; and, for instance, four-phase signal $\Phi$R ($\Phi$R1–$\Phi$R4) for driving the read register 213, each being an identical frequency obtained by dividing the frequency of the basic clock signal 4fcp. However, the phase of each of the phase signals ($\Phi$I1–$\Phi$I4, $\Phi$S1–$\Phi$S4, $\Phi$R1–$\Phi$R4) is offset in accordance with predetermined relationships. The image signal PS read by the image sensor 37 is converted to a digital anti-logarithm value PSD by an A/D converter 221 in an arithmetic processing section 200. The digital anti-logarithm value PSD is converted to a digital density value DS when a reciprocal number of the transmittance of the anti-logarithm value PSD is subjected to logarithmic transformation in a logarithm table circuit (lookup table) 224, and is stored in a memory 223. In addition, the image signal PS from the drive timing section 202, the horizontal synchronizing signal Hsync, and the vertical synchronizing signal Vsync are input to the arithmetic processing section 200 so as to effect arithmetic processing in correspondence with the operating status of the image sensor 37.

The phase signals $\Phi$I ($\Phi$I1–$\Phi$I4) output from the drive timing section 202 are applied to the photoelectric conversion/accumulation section 211 via a gate circuit 204. This gate control 204 is controlled by a control signal CS from the CPU 203. In addition, the CPU 203 is connected to the arithmetic processing section 200, and is adapted such that the CPU 203 is capable of determining the operating status of the image sensor 37 on the basis of the image signal PS, the horizontal synchronizing signal Hsync, and the vertical synchronizing signal Vsync, thereby effecting the processing of image information. Accordingly, the CPU is capable of outputting the control signal CS in synchronization with the vertical synchronizing signal Vsync from the drive timing section 202, i.e., in synchronization with the scanning of one image. Furthermore, the arrangement is such that a selection signal SL corresponding to the control signal CS is input from the CPU 203 to the logarithmic table circuit 224 in the arithmetic processing section 200.

Figure 7:
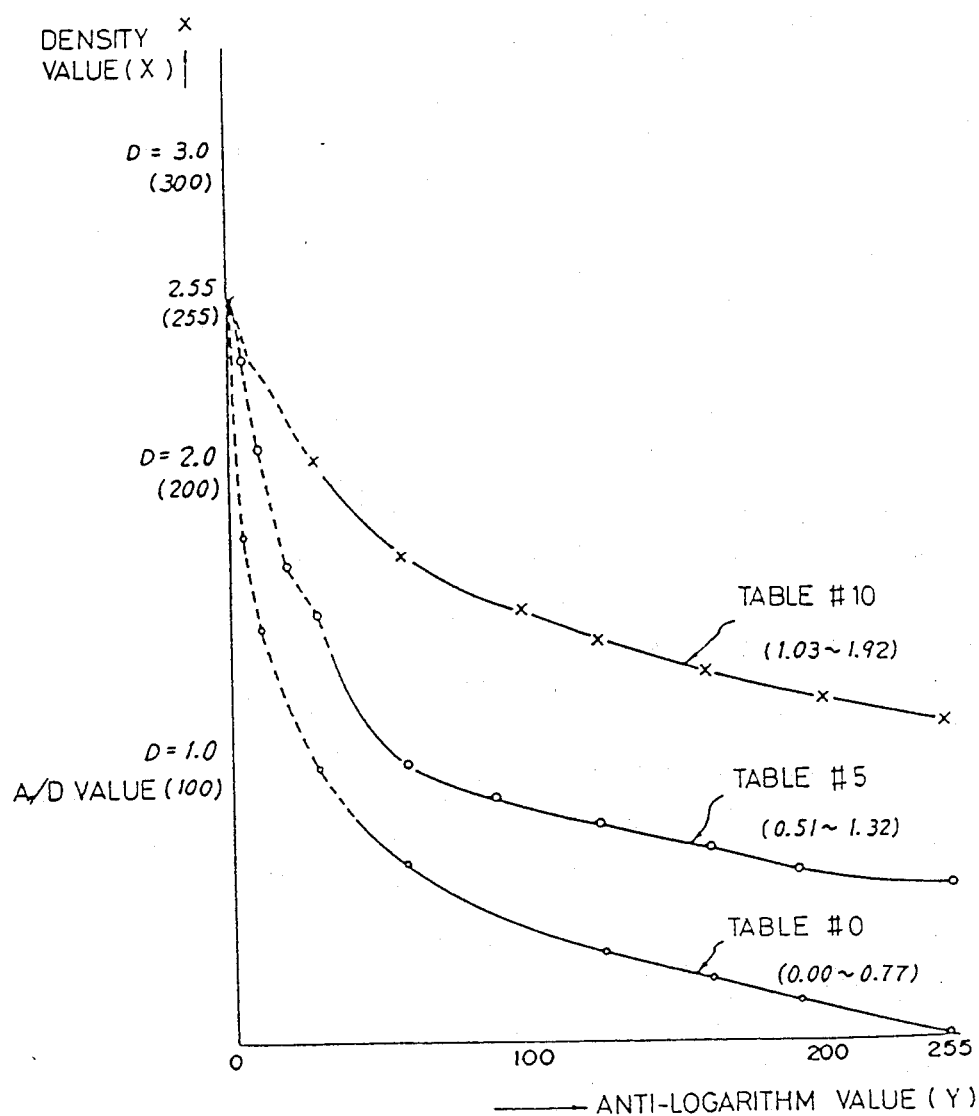
FIG. 7 is a graph illustrating an example of tables of logarithms.

Here, a description will be made of the contents of the logarithmic lookup table in the logarithmic table circuit 224, which is constituted by a read only memory (ROM) or the like. The relationships between an anti-logarithm value Y and a density value X are shown in FIG. 7. For instance, if an output of the A/D converter 221 is eight bits (0–225), and the density resolution is assumed to be 0.01, in table #0, the range of a 0.00–0.77 density is the effective area of the 0.01 density resolution; in table #5, the range of a 0.51–1.32 density is the effective area of the 0.01 density resolution; and in table #10, the range of a 1.03–1.92 density is the effective area of the 0.01 density resolution. Accordingly, if a plurality of such tables (tables corresponding to dynamic ranges R1, R2 shown in FIG. 8) are prepared, it is possible to change over the dynamic range and convert to an accurate density value Z with high resolution without being subjected to the effect of a noise component and offset caused by a dark current or the like. In other words, resolution in portions indicated by dotted lines in FIG. 7 is very poor in comparison with that of solid lines, so that accuracy cannot be compensated for particularly when digital processing is effected. However, if the solid-line portions of, for instance, tables #0 and #5 are selected appropriately, the range with a density value D of 0.01–1.32 can be read with the 0.01 resolution even if the dynamic range of the image sensor 37 shows D=1.0 (10:1) or below.

Figure 8:
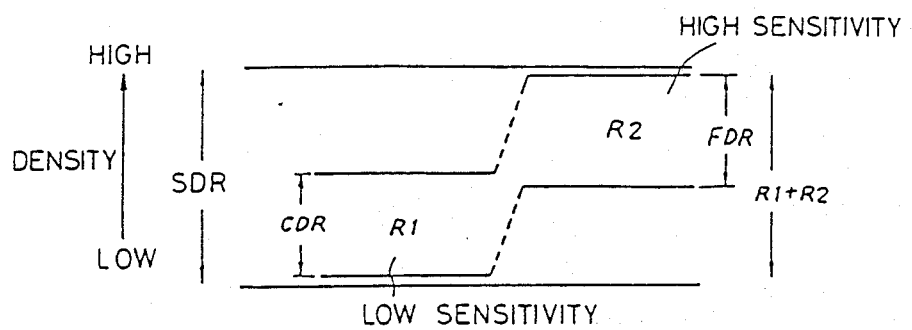
FIG. 8 is a diagram explaining the dynamic range of the image sensor.

FIG. 8 shows typical relationships between the dynamic range FDR required in a high-density image (frame image portion) and a dynamic range CDR required in detection of the film edge and the frame edge. This diagram show that image information with a density higher than the film base density and image information with a density lower than the vicinity of the average density of the film image can be changed over, as required, and detected by changing the accumulation time to cause a shift from a range R1 to a range R2, thereby changing over the setting of the dynamic range of the image sensor 37 to increase the dynamic range as a whole. Incidentally, when the dynamic range is set to CDR, the sensitivity becomes low, as shown at FIG. 5(B), and if the dynamic range is set to FDR, the sensitivity becomes high, as shown at FIG. 5(C).

Figure 9:
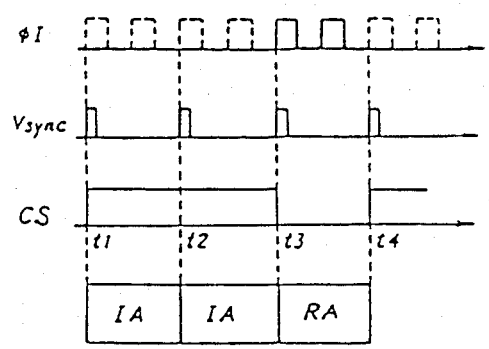
FIG. 9 is a diagram explaining the operation of the image sensor.

In this configuration, the basic clock signal 4fcp from the pulse oscillator 201 is input to the drive timing section 202, which, in the same manner as described above, generates the clock signals CK and status signals of the image signal SP, the horizontal synchronizing signal Hsync, and the vertical synchronizing signal Vsync. The phase signals $\Phi$S and $\Phi$R of the clock signals CK are respectively applied directly to the holding section 212 and the read register 213 of the image sensor 37, while the phase signal $\Phi$I is applied to the photoelectric conversion/accumulation section 211 via the gate circuit 204. The image signal PS from the image sensor 37 is input to the arithmetic processing section 200 and is processed, exactly in the same way as described above. At this point, the CPU 203 determines via the arithmetic processing section 200 the operating state of the image sensor 37, i.e., a cycle mode of photoelectric conversion/accumulation, transfer, hold and read, and changes over the control signal CS to control the gate circuit 204. This control can also be effected by directly inputting the status signals (SP, Hsync, Vsync) from the the drive timing section 202 to the CPU. When the CPU 203 thus detects the photoelectric conversion/accumulation mode of the image sensor 37, and the gate 204 is changed over by the control signal CS, the phase signals ΦI1-ΦI4 are fixed to a predetermined combination of the logic "L" or "H", e.g., ΦI1="L", ΦI2= "L", ΦI3="H", and ΦI4="H", and are applied to the photoelectric conversion/accumulation section 211. In this case, the phase signals ΦS and ΦR are respectively input to the holding section 212 and the read register 213. If the time of fixing the phase signals ΦI1-ΦI4 from the gate circuit 204 by such a control signal CS is synchronized with the vertical synchronizing signal Vsync output in corresponding to the scanning of one image, as shown in FIG. 9, the photoelectric conversion/accumulation mode alone can be repeated a plurality of times (two times in the illustrated case). In other words, when the CPU 203 determines that the image sensor has assumed the photoelectric conversion/accumulation mode (point of time t1), the CPU 203 senses the control signal CS to the gate circuit 204 to fix the phase signals ΦI1-ΦI4 to a predetermined level of logic and effect the photoelectric conversion/accumulation. Subsequently, when the photoelectric conversion/accumulation is conducted a plurality of times in synchronization with the vertical synchronizing signal Vsync, the CPU 203 causes the control signal CS to disappear to reset the gate circuit 204 (point of time t3), and applies the phase signal I from the drive timing section 202 as it is to the photoelectric conversion/accumulation section 211. As a result, the image sensor 37 effects the transfer, holding, and reading of the accumulated charges, and commences the next operation from a point of time t4 when the next vertical synchronizing signal Vsync is input.

In this apparatus, the CPU is used by selecting tables of logarithms in the logarithm table circuit 224 by the selection signal SL in correspondence with the control of the gate circuit 204.

First, a technique of setting the above-mentioned tables of logarithms will be described. At this juncture, the following assumptions are made: The logarithm is a common logarithm with "10" as a bottom; the basic accumulating time of the image sensor 37 is TB; the photometrically accumulating time is TX; an A/D conversion value (an anti-logarithm value) at the time of scanning (hereafter referred to as this scanning) to effect photometry using tables of logarithms is Y; a photometric density value from the logarithm table circuit 224 is X; a photometric luminance value is P; a coefficient of accumulation time is a; the number of tables of logarithms is Tn; a density coefficient is K; the number (page) of a table of logarithms is n; a maximum anti-logarithm A/D conversion value at the time of conducting photometry (hereafter referred to as prescanning) for selecting the No. of a logarithm conversion table using an anti-logarithm table is YP; an A/D conversion value of luminance of the base is PB; and a required dynamic range is D. Since the dynamic range is D, and the logarithm table No. is Tn, the coefficient of accumulation time a is defined as:

$$a = (D)^{\frac{1}{Tn}} \quad (1)$$

The setting of the basic accumulation time TB is effected prior to the photometry of the original film, usually at the time of operating calibration for detecting calibration data by means of the reference film. At the time of detecting image information, the reference density of the film base is usually set to zero to enhance the resolution of image information. Therefore, photometry of the base luminance PB is first carried out. Incidentally, at the time of detecting the frame edge, the brightness of the light source at the time when the negative film is not present may be set to a zero reference density. At this point, the basic accumulation time TB corresponding to the base luminance PB is selected by consecutively extending the accumulation time from a minimum accumulation time which allows the image sensor 37 to compose image information in such a manner that an A/D conversion value provided with slight leeway becomes $(M-\alpha)$ with respect to a saturate anti-logarithm output of the A/D converter 221.

Next, the setting of the photometric accumulation time TX is effected by prescanning, as required. The photometric accumulation time TX is determined by n determined by a prescanning table by using as address information the maximum luminance value YP of the anti-logarithm output Y of the A/D converter 221 obtained by conducting photometry with the basic accumulation time TB and by using the anti-logarithm table with respect to the original film regarding which photometry is to be carried out. In other words, $$TX = TB \cdot a^n \quad (2)$$

The A/D conversion value YP determined by photometry with the basic accumulation time TB from the above Formula (2) is expressed by $YP = PB/a^n$. If this formula is subjected to logarithmic transformation, we have $$\log yP = \log (PB/a^n)$$

$$\log YP = \log PB - n \cdot \log a \quad (3)$$

Therefore, $$n \cdot \log a = \log PB - \log YP \quad (4)$$

so that $$n = (\log PB - \log YP)/\log a \quad (5)$$

Incidentally, n is determined by discarding fractions. Accordingly, a logarithmic table No. n selected by a prescan table memory obtained from the above Formula (5) is determined by using as address information the A/D conversion maximum luminance value at the time of prescanning.

Meanwhile, if the photometric luminance value is assumed to be P, the A/D conversion value Y at the time of the real scanning is expressed as follows:

$$Y = P \times a^n \quad (6)$$

Since the photometric luminance value X is a common logarithm value of a reciprocal of a luminance rate, the relationship between the AD reference value PB of the base luminance and the photometric density X with respect to a photometric density value P can be defined as follows:

$$X = K \cdot \log PB/P \qquad (7)$$

If the above Formula (6) is transformed, $P = Y/a^n$, if this formula is substituted into the above Formula (7), we obtain $$\begin{aligned} X &= K \cdot \log (PB/Y/a^n) \\ &= K \cdot \log (PB \cdot a^n/Y) \\ &= K \cdot \log (Y/PB \cdot a^n)^{-1} \\ &= -K [\log Y - \log PB - n \cdot \log a] \\ &= K [\log PB - \log Y + n \cdot \log a] \end{aligned} \qquad (8)$$

Thus, $$X = K \cdot \log PB + n \cdot K \cdot \log a - K \cdot \log Y \qquad (9)$$

Accordingly, the photometric density value X selected by the logarithmic table memory obtained from the above Formula (9) is determined by using as the address information the logarithmic table No. n determined at the time of prescanning as well as the A/D conversion value Y at the time of real scanning.

Figure 10:
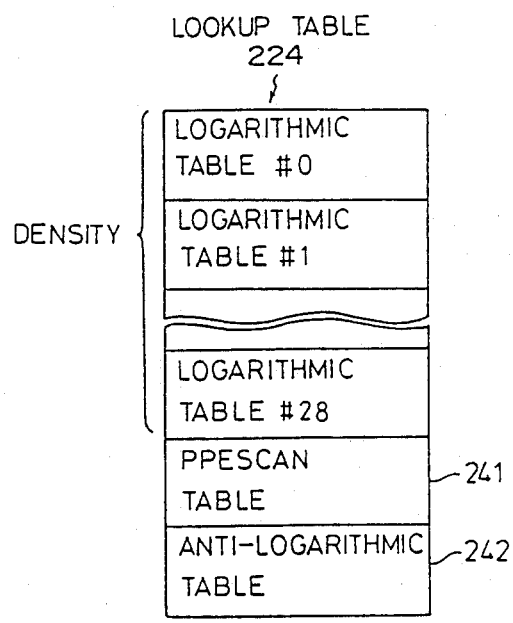
FIG. 10 is a diagram illustrating the arrangement of the tables of logarithms.

As described above, the arrangement of the logarithmic table circuit 224 is shown in FIG. 10. As logarithmic tables, 29 tables of #0–#28 are prepared, and a prescan table 241 and an anti-logarithmic table 242 which delivers an output in a one-to-one correspondence with an input are prepared. In the case of 8-bit processing, addresses are 0–255, and the photometric data are in the range of 0–255, so that the prescan table 221 selects the table No. n as follows:

$$n = (\log 250 - \log YP)/1.269 \qquad (10)$$

In this case, assuming that the dynamic range D required is set to 1:1000, the accumulation time coefficient a can be expressed as $$a = (1000)^{\frac{1}{29}} = 1.269$$

Thus, the above Formula (10) can be obtained. In addition, the logarithmic tables #0–#28 are respectively constituted by 256 bytes, and the density value X is obtained from the following formula:

$$X = 100 \cdot \log 250 + n \cdot \log (1.269) - 100 \cdot \log Y \qquad (11)$$

The density value X is read by the addresses 0–255 corresponding to the respective logarithmic tables #0–#28. In this case, if a density value D=0 is made to correspond to "1" of the A/D conversion value, K=1/0.01= 100, and the density coefficient K is determined in relation to the required resolution and the dynamic range. In addition, in the case of 8-bit processing, the absolute value X is clipped at "255", the fractions are discarded, and Y is made to equal 255 when Y=0.

The logarithmic tables thus set in the logarithmic table circuit 224 are selected by the selection signal SL from the CPU 203. Accordingly, the image signal PS from the image sensor 37 is transformed into the logarithmic table density value X corresponding to the accumulation time.

Thus, the image information PS from the image senor 37, and as the transformation tables corresponding to output signals are changed over in correspondence with a set frequency, the dynamic range FDR required for a high-density image and the dynamic range CDR required for a low-density image are selected, such as those shown in FIG. 8. Incidentally, when detecting the edge, since it suffices to determine an amount of relative displacement rather than an absolute amount of light, the accumulation time may be set to about ½ of the accumulation time in detecting frame image information for practical purposes. In addition, the accumulation time when the brightness of the light source at the time when the negative film is not present may be determined to be about 50% of the accumulation time with the base density used as the reference.

(2) Description will now be made of a method of adjusting the sensitivity of the image sensor by adjusting an amount of light from the light source.

The accumulation time of the image sensor 37 for photoelectric conversion is set to a predetermined value, and the amount of light per unit area (e.g., per one picture element) from which the image sensor 37 receives light is measured. Determination is then made as to whether or not the measured value falls within a predetermined range depending on the density to be detected. If the measured value does not fall within the predetermined range, the amount of light is adjusted by adjusting an amount of insertion of the light-adjusting filter 27 into the optical path, or the electric power supplied to the printing light source 19 is adjusted. Incidentally, when adjusting the amount of light, the amount of insertion of an ND filter may be changed, or a diaphragm provided in front of the image sensor may be adjusted. The amount of light per unit area is then measured again, the adjustment of the light-adjusting filter 27 or the adjustment of the power supply is repeated in such a manner that the amount of light per picture element of the image sensor falls within the predetermined range. When the film edge or frame edge is detected using this adjustment method, the sensitivity of the image sensor is lowered by reducing the amount of light to a lower level than in the case of detecting the density information of the frame image, while, in detecting the density information of the frame image, the sensitivity of the image sensor is raised by increasing the amount of light to a higher level than in the above case. Consequently, since outputs of the image sensor change, as shown in FIGS. 5(B) and 5(C), the film edge or the frame edge can be detected, and, at the same time, the image information can be detected. Incidentally, if the amount of light itself applied from the light source is controlled, instead of controlling the light-adjusting filter or the like, the power consumption can be reduced.

Since the dynamic range of the image sensor 37 is generally narrow, if it is desirable to obtain detailed density information of the photographed area of the film, the sensitivity is set in such a manner that the density signal of the film base (nonphotographed area), which is the minimum photographic density area of the film becomes the minimum (maximum as an output of a photoelectric conversion element, and a saturated value, or a value immediately before saturation). Accordingly, as can be seen from FIG. 5(C), an output on the low-density side is saturated, so that it is usually impossible to distinguish a portion without any film from a film base portion. Therefore, in order to distinguish the portion without any film from the film base portion (i.e., detect the film edge), the optical sensitivity must be lowered by reducing the charge accumulation time or other similar measure, as described above. If the sensitivity of the image sensor is lowered, its output becomes such as is shown in FIG. 5(B). In this state, since an output on the high-density side saturates, a difference in the density distribution information between the nonphotographed area of the film (base portion) and the photographed area becomes small, so that it becomes difficult to accurately detect the density distribution information of the photographed area. However, since the sensor outputs change substantially on the low-density side, the detection of the film edge and the frame edge is facilitated. Since the high-density frame edge provides a large detection ratio (the presence or absence of the frame), even if the frame edge is saturated, no problem is caused in the detection of the edge.

[Arrangement of Arrays of Light-Receiving Elements]

Figure 11A:
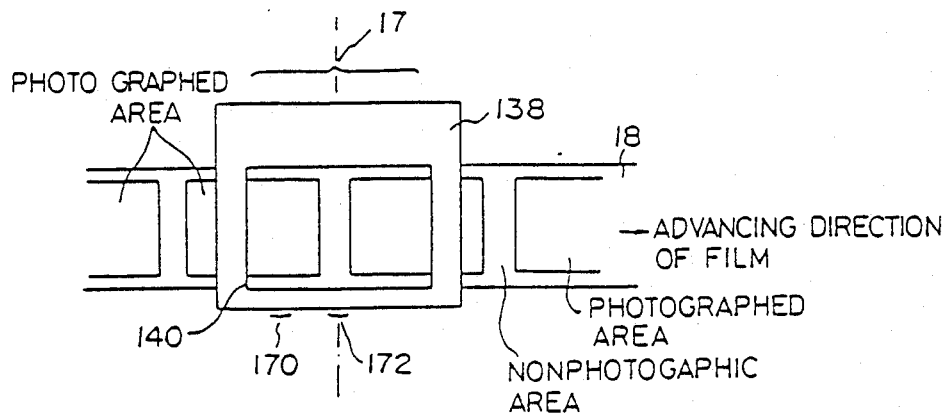
FIG. 11 is a diagram illustrating corresponding relationships between a film passing a printing position and a light-receiving surface of the image sensor.
Figure 11B:
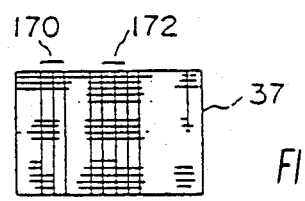

As can be seen from FIG. 5(B), the density differs remarkably between a case where the film is not present and a case where it is present, or between the photographed and nonphotographed areas of the film. Therefore, at the time of feeding the film, it suffices to pay attention to changes in the density in the advancing direction of the film so as to detect the film edge and the frame edge. In practice, however, in order to detect the arrival of the frame edge, i.e., the edge of a boundary between the photographed area and the nonphotographed area, at the center of the printing position, the arrangement is provided in this embodiment in such a manner that the frame edge is detected by outputs of one or two or more arrays of light-receiving elements of the exposure-controlling two-dimensional image sensor 37 in a first light-receiving element area 170 on the side where the film enters, the arrays being disposed perpendicularly of the advancing direction of the film. To detect the edge of the leading frame, after the edge of the leading frame is preliminarily detected, the film is fed at high speed a distance slightly shorter than an interval between the first light-receiving element area 170 and a second light-receiving element area 172 (i.e., from the first light-receiving element area to immediately before the second light-receiving element area). The film is then fed at low speed, and the position of the edge of the leading frame is detected accurately at the center of the printing position by outputs of one or two or more arrays of light-receiving elements in the second light light-receiving element area 172 disposed downstream of the light-receiving element area 170 and parallel with the area 170 (preferably, the central portion of the printing position is detected). FIG. 11(A) shows the film being fed at a printing position 17 (i.e., a mask opening 140 in an upper mask 138), while FIG. 11(B) illustrates a light-receiving surface of the corresponding image sensor 37.

Each of the light-receiving element areas 170, 172 integrates outputs of several light-receiving elements of the groups of light-receiving element arrays each including at least one array of light-receiving elements extending perpendicularly of the advancing direction of the film, the light-receiving elements corresponding to the image width of the negative film size. Each of the light-receiving element areas 170, 172 thus eliminates partial differences in the density of the film. The operation of the edge determination is performed by integrating or averaging a plurality of sensor outputs corresponding to the image width of the negative film size perpendicular to the advancing direction of the film, since in the edge detection it suffices if the difference in the density in the vicinity of the film base density can be detected. Such operation of the sensor outputs corresponding to the negative size can be effected readily using a microcomputer.

In other words, in automatically controlling the feeding of the frame image, since the frame size of the negative film 18 is already known from measurement or input of data, detection areas of image information and the groups of arrays of light-receiving elements are used by being changed over depending on the frame size, as shown in FIG. 13(1). If the entire picture elements of the image sensor 37 are constituted by a j number of rows (1–40) and an i number of lines (1–30), area F2 is used in the case of, for instance, a 135F size, and area F1 is used in the case of a 110 size. Then, by assuming that a measured value of a picture element $S_{ij}$ of the image sensor 37 is $TS_{ij}$, and an anti-logarithm value of a $j_n$-th sampling point in a j-th line is determined. In the case of the 135F size, since the number of picture elements is $23 - 7 = 16$, an average value T thereof becomes as follows:

$$T = \sum_{i=7}^{23} TS_{i,jn}/16 \tag{12}$$

If the negative film 18 is detected with fine pitches, an anti-logarithm value $THS_{135F}$ of the 135F size at respectively adjacent sampling points can be derived from the following formula:

$$THS_{135F} = \frac{\sum_{i=7}^{23} TS_{i,jn} + \sum_{i=7}^{23} TS_{i,jn+1} + \cdots}{16} \tag{13}$$

Similarly in the case of the 110 size, since the number of image elements is $19 - 11 = 8$, its average mean value T becomes as follows:

$$T = \sum_{i=11}^{19} TS_{i,jn}/8 \tag{14}$$

If the negative film 18 is detected with fine pitches, an anti-logarithm value $THS_{110}$ of the 110 size at respectively adjacent sampling points can be derived from the following formula:

$$THS_{110} = \frac{\sum_{i=11}^{19} TS_{i,jn} + \sum_{i=11}^{19} TS_{i,jn+1} + \cdots}{8} \tag{15}$$

If measured values thus obtained are subjected to sampling and a frequency distribution is thereby determined, an anti-logarithmic curve PC as shown in FIG. 17 can be obtained.

The film edge or the frame edge can be detected if the above operations are carried out by reducing the accumulation time of the exposure-controlling two-dimensional image sensor 37, or by lowering the amount of light in such a manner that an output shown in FIG. 5(B) is obtained.

[Detection of Edge]

FIG. 1 is a flowchart of a routine of a method of detecting an edge in accordance with this embodiment. However, this edge detecting method, which can be mainly used as a means for positioning a photographed frame at a printing position, constitutes a subroutine in a control system incorporated in a printing apparatus. The aforementioned third and fourth forms of the invention are applied to this routine.

First, a mask of a size corresponding to that of the negative film 18 from which a print is made is placed at the predetermined position 17 in a printing section. In Step S1, the size of the mask opening of the film feeder 10 is measured as in the case of, for example, Japanese Patent Laid-Open No. 151626/1985, to measure the size of the negative film. Incidentally, the measurement of the size may be input by visual observation. In accordance with the measurement of the size, the feeding rate of the negative film 18 is set, and selection of arrays of light-receiving elements is effected automatically. Furthermore, an amount of printing exposure and an amount of correction thereof are controlled.

In the next Step S2, the accumulation time is reduced by the above-described method (e.g., reduce the accumulation time to ½ of that at the time of detecting the frame information) so that image information of a density lower than the film base density can be obtained. In Step S3, the pulse motor 50 of the film feeder is controlled in such a manner that the film can be fed at medium to high speed by detection with single-picture-element pitches (e.g., about 1 mm pitches), and the film is inserted into the film feeder with the feed roller being rotated by the pulse motor 50, thereby starting the feeding of the film. In Step S4, outputs of arrays of light-receiving elements in the light-receiving element area 170 are fetched. In Step S5, the frame edge of a frame closest to the film edge (leading frame) is preliminarily detected by determining whether or not outputs L of the arrays of light-receiving elements have reached a value between a value $L_B$ corresponding to the film base density and a value $L_0$ corresponding to the fogging density ($L_0 < L < L_B$).

If the determination in Step S5 is NO, the medium- to high-speed feeding of the film is continued, and the fetching of outputs is continued.

At this point, both in the case of a piece negative which does not include a leading end portion of an elongated negative and in the case of an elongated negative in which fogging has occurred in the vicinity of the leading edge portion of the film as well as an ordinary piece negative, outputs of the arrays of light-receiving elements assume a predetermined value at a frame edge portion of the leading frame, as described above. Accordingly, by determining whether or not the outputs of the arrays of light-receiving elements have fallen in a predetermined range, the frame edge of the leading frame can be preliminarily detected without being affected by fogging in the vicinity of the leading edge portion of the film. Incidentally, in this case, an arrangement may be provided such as to facilitate discrimination of the fogged portion by detecting the high-density side by temporarily prolonging the accumulation time. When it is determined in Step S5 that the edge of the leading frame has been preliminarily detected, in Step S7, the film is fed at high speed by a length corresponding to an interval between the detecting position in the first light-receiving element area 170 and immediately before the second light-receiving element area 172 until the film is fed to a position where the edge of the leading frame can be precision-detected by the arrays of light-receiving elements in the light-receiving element area 172. Subsequently, in Step S8, the film is fed at low speed by detection with fine pitches (e.g., about 0.1 mm pitches) that are smaller than the single-picture-element pitches by controlling the pulse motor 50. In the subsequent Step S9, with the film being fed with the fine pitches, the edge of the leading frame is measured precisely at a portion E shown in FIG. 13. In Step S10, determination is then made as to whether or not the edge of the leading frame has been detected by the arrays of light-receiving elements in the second light-receiving element area 172.

Figure 15:
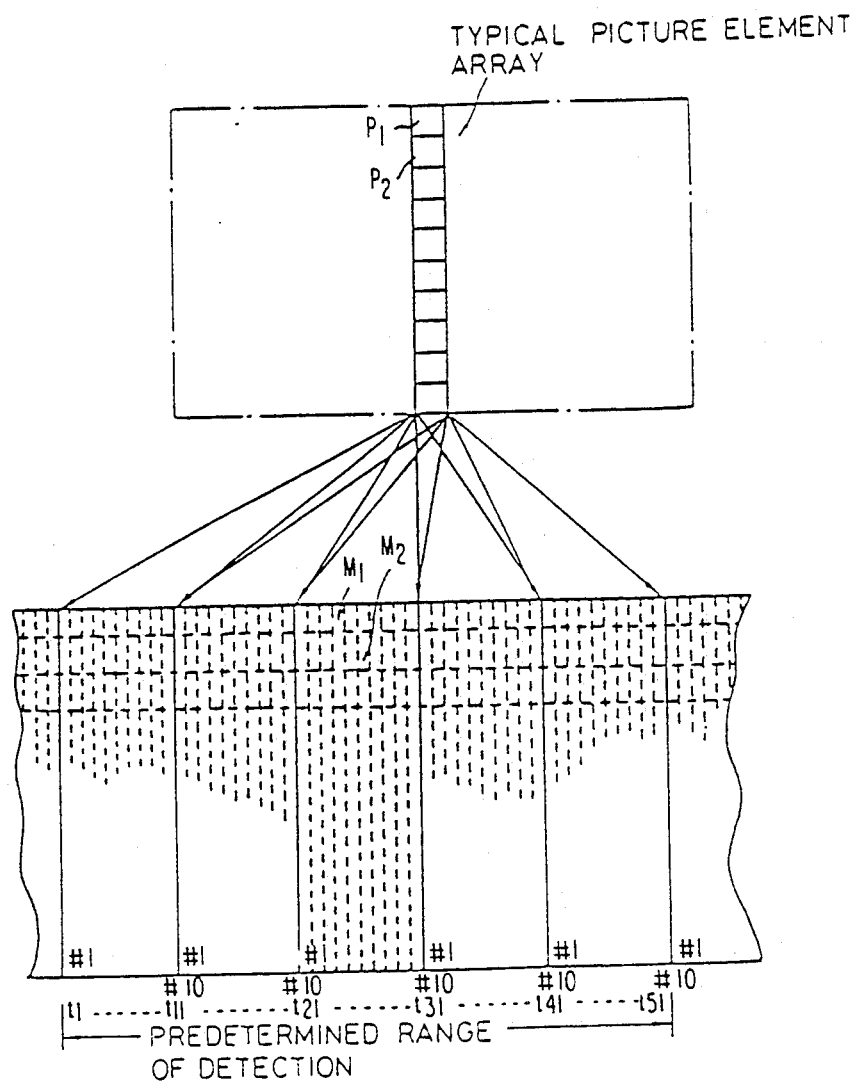

If an image sensor having coarse resolution and generally used for exposure control, exposure compensation, or the like is used to precisely detect the frame edges, determination of data between adjacent picture elements by interpolation (hereafter referred to as the picture-element pitch interpolation) is effected, as will be explained below. Incidentally, description will be made below of detection of frame edges other than the edge of the leading frame for the sake of explanation, but the same procedures apply to the leading frame as well. This picture-element pitch interpolation is effected as follows: When an edge is detected by a sensor with a low picture-element resolution (e.g, in units of approximately 1.0 mm on the film), a sharp change does not take place between a blank portion and a frame image portion, but a slow change takes place therebetween, so that detection is carried out such that the negative film 18 is fed while detection is being carried out with fine picture-element pitches of 1/10 mm-pitches or thereabout, and the position at which the direction of a change with time of the light-receiving elements is inverted is detected as the position of the edge. In other words, as shown in FIG. 15, picture-element data are formed on memories by providing a plurality of stored picture-element data areas M (e.g., a portion equivalent to 10 picture elements of #1–#10) in correspondence with a typical array of picture elements P constituted by a plurality of light-receiving picture elements of the two-dimensional image sensor. For example, stored picture-element data $M_1$ of a memory corresponding to a light-receiving picture element $P_1$ is divided into $M_{11}$–$M_{110}$, while store picture-element data $M_2$ of another memory corresponding to a light-receiving picture element $P_2$ is divided into $M_{21}$–$M_{210}$. The other light-receiving picture elements are also formed with the stored picture-element data of #1–#10.

Subsequent to this storage, as shown in FIG. 17, light-quantity characteristics PC are determined by processing the picture-element data store in the memories, i.e., image information detected by interpolating the data between adjacent picture elements for the negative film 18, and edges of adjacent frames and an unphotographed area (blank area) R between adjacent frames of the negative film 18 are detected. In this case, (1) it is necessary for a maximum value PM of the light-quantity characteristics PC to fall within a range formed between a base light-quantity value MA of the negative and a threshold CV which is lower than the same by a predetermined rate (e.g., 80%). The reason for this is that the edge of an image frame of the negative film is at a boundary between the image frame and an unphotographed area, so that the quantity of light generally becomes greater than a fixed threshold CV. In addition, (2) it is necessary that a distance from the position of the maximum value PM of the light-quantity characteristics PC to a position at which the light quantity displays a sharp negative inclination, i.e., a distance l from the maximum value PM to a position at which the light quantity declines, be a more than a predetermined distance (e.g., 1 mm). This is because a frame edge exists after passing the blank area R between adjacent frames, and it is necessary to eliminate a noise component. That range may have a certain allowable width. Furthermore, (3) a light quantity NP at the distance l from the maximum value PM corresponds to an edge of an image frame, and it is necessary that this light quantity falls within a range of a certain percentage relative to the maximum value PM. This means that the light quantity is necessarily smaller than the maximum value PM, and that it inclination is required to be of a certain magnitude. If there is not much difference between the light quantity NP and the maximum value PM, it is impossible to distinguish an image from an unphotographed area. In this case, the edge is detected only when all of the aforementioned three conditions are met. In addition, in the case of the leading frame, the light quantity characteristics become like PC' shown by an alternate long and short dashes line in FIG. 17. Incidentally, in this example, the anti-logarithmic values of the light quantity are obtained by 8 bits (0–255).

Figure 14:
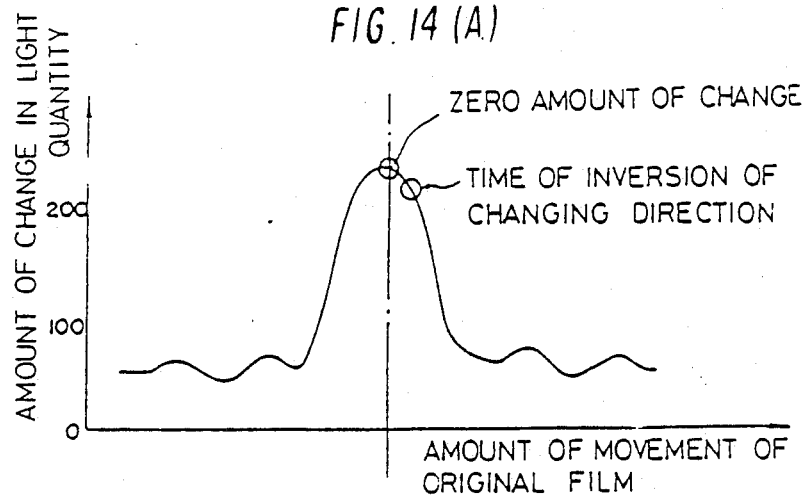
FIG. 14 is a diagram illustrating a frame edge.
Figure 14:
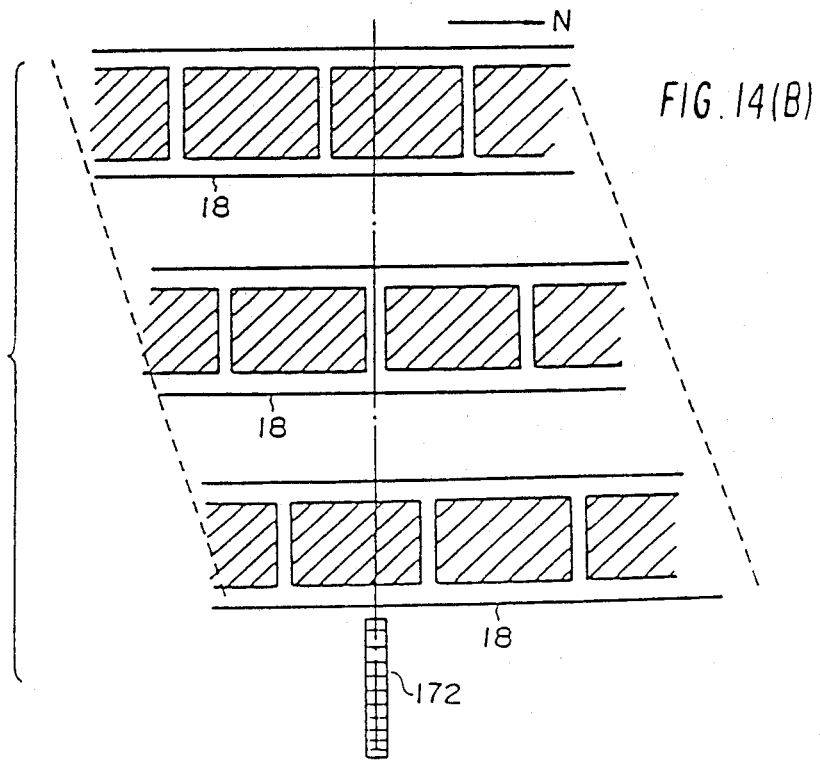

Here, if the image information is detected by the light-receiving element area 172 of the image sensor 37, data for each picture element as shown in FIG. 12(B) can be obtained. In FIG. 12, the image information is shown as density information. Incidentally, this data may be an anti-logarithm, or the aforementioned density information determined by subjecting a reciprocal number of the anti-logarithmic transmittance to logarithmic transformation. As is apparent from the corresponding relationships between FIG. 12(A) and FIG. 12(B), in general, there are appreciable differences in the density value between image frames 2A, 2B, 2C, .. . photographed on the negative film and the nonphotographed areas RA, RB, RC, . . . between adjacent frames. Therefore, the positions of frame edges that are boundaries between the image frames 2A, 2B, 2C, . . . and the unphotographed areas RA, RB, RC, . . . can be precisely detected by searching with the light-receiving element area 172 of the image sensor 37 areas in which the density is below a predetermined value, and there is a portion which undergoes a sharp change in the horizontal direction of the density value, and a change in the vertical direction (the direction perpendicular to the advancing direction of the negative film 18) is within a fixed range. FIG. 13(B) shows the state of this detection, in which the negative film 18 is fed in the direction of N to the predetermined position 17, and the nonphotographed area RB between the adjacent frames and the position of the edge of the image frame 2A are detected in the light-receiving element area of the image sensor 37. The light-receiving element area of the image sensor 37 is adapted to be located at the central portion of the mask opening. In FIG. 12(B), although the width of the nonphotographed areas is shown widely for convenience sake, this edge can, in fact, be detected on the negative film 18 by the exposure-controlling image sensor or the like with a relatively low resolution of 1.0 mm or thereabout, in the same way as described above. In other words, an amount of change with time (an amount of change in light quantity, i.e., an anti-logarithm) in the light-receiving element area 172 of the image sensor 37, which is detected when the negative film 18 is fed by fine pitches, as shown in FIG. 14(B), is shown in FIG. 14(A). From this, the position of inversion of the changing direction can be detected as an edge between an unphotographed area and an image frame, with a position at which the amount of change in light quantity becomes zero as a reference.

Incidentally, the above-described detection may be carried out with a method disclosed in Japanese Patent Laid-Open No. 103032/1979 using a high-resolution sensor.

When it is determined in Step S10 that the edge of the leading frame has been detected, the process proceeds to Step S11.

In Step S11, the negative film 18 is fed at high speed by a fixed amount by a distance $S_2$ (in this embodiment, approximately ½ of the frame since the light-receiving element area 172 is located at the central portion of the mask opening) until the leading frame is positioned at the predetermined position 17 on the basis of size information determined in the size measurement (Step S1). Subsequently, the feeding is stopped in Step S12. As a result, the leading frame is automatically positioned at a predetermined position. After the positioning of the leading frame, the sensitivity is changed over to high sensitivity by extending the accumulation time of the image sensor by the sensitivity changing-over method explained above in Step S13, and determination of or compensation for the amount of exposure is carried out by conducting photometry of frame image information. In Step S14, determination is then made as to whether or not printing is necessary, and, if necessary, printing is carried out in Step S16. In a subsequent Step S19, the accumulation time of the image sensor is reduced, and, in Step S20, determination is made as to whether or not the film is present. If present, since the second light-receiving element area is located in the central portion of the mask, in Step S21, the negative film 18 is fed by slightly less than one-half of the frame. Subsequently, in Step S8, the feeding mode is changed over to fine-pitch feeding so that the edge of the second frame can be precisely detected by the arrays of light-receiving elements in the second light-receiving element area 172.

The feeding of the negative film 18 is continued at low speed in Step S8 until the edge of the second frame is detected in Step S10. If the position of the edge between the image frame 2A and the nonphotographed area RB is detected, the negative film 18 is fed at high speed by a fixed amount in Step S11 by a distance $S_2$ until the frame is located in the predetermined position 17 on the basis of the size information obtained in the size measurement (Step S1). Subsequently, the feeding is stopped in Step S12. In this case, a distance E traveled by the negative film 18 after the high-speed, fixed-amount feeding $S_1$ until the nonphotographed area RB between the image frames 2A, 2B and the position of the edge of the image frame 2A are detected is a parameter for compensating for variations and the like of the distance of the nonphotographed area RB. If the negative film 18 is fed by an amount of feed of the image frame 2A, i.e., $D=S_1+E+S_2$ (one frame portion compensated), in the state shown in FIG. 13, the negative film 18 stops in a state in which it is positioned accurately in the predetermined position 17.

After the negative film 18 is thus fed and stopped, the sensitivity is changed over to high sensitivity by extending the accumulation time of the image sensor by the sensitivity changing-over method described in Step S13. The frame image information is then subjected to photometry, and the determination of and compensation for the amount of exposure, or the like are carried out. In Step S14, determination is made as to whether or not printing is necessary. If printing is necessary, printing is executed in Step S16. In order to feed the next image frame to the printing position to effect printing after completion of the printing of the frame or in a case where the image is not suitable for printing, the accumulation time of the image sensor is shortened in Step S19, and, in Step S20, determination is made as to whether or not the negative film 18 is present. If the film is present, the negative film 18 is fed at high speed by about one-half of the frame interval in Step S21 in accordance with the size information determined in Step S1, and the process then returns to Step S8. Hereafter, by repeating the feeding and stopping, the printing of each image frames can be effected consecutively. Then, when it is determined in Step S20 that the negative film 18 is absent, the motor 50 is automatically stopped to complete the operation. In this case, although the arrangement is such that the frame edge is precisely detected at the position corresponding to the central portion of the negative film, the detection may be effected at a portion other than the central portion.

Meanwhile, when the frame edge is not detected in Step S10, the image frame is such that the frame edge cannot be detected since the film is extremely underexposed. Therefore, the negative film 18 is fed by a fixed amount, i.e., about the remaining one-half of the usual one-frame length (38 mm in the case of the 135F size) in Step S22, and the film is stopped in Step S12.

As has been described above, according to the present embodiment, the leading frame which is the closest to the film edge can be stopped automatically at the predetermined position without any need to select a piece negative or an elongated negative in advance with the film feeder driven, simply by inserting the piece negative or the elongated negative into the film feeder or without changing over the setting of the film feeder. Accordingly, it is possible to obtain an advantage in that the positioning of the leading frame which is the closest to the film edge can be effected efficiently and automatically.

If the light-receiving element area 172 is composed of arrays of light-receiving elements having high resolution, an arrangement can be adopted such that the position of a single or a plurality of the arrays of light-receiving elements where the frame edge is located can be determined precisely by single-picture-element pitches. This arrangement makes the feeding speed even higher. In this case, the accuracy of detecting the frame edge position in the printing position 17 can be increased, so that it is possible to accurately determine an amount of the film feed to locate the photographed frame substantially at the center of the printing position 17.

Alternatively, an arrangement may be adopted such that the light-receiving element area 170 may be composed of arrays of light-receiving elements having high resolution to preliminarily detect the frame edge with plural-picture-element pitches. In addition, the light-receiving element area 170 and the light-receiving element area 172 may be composed of a combination of arrays of light-receiving elements having high resolution and arrays of light-receiving elements having low resolution.

If the resolution of the two-dimensional image sensor is high, the feeding may be effected with the same picture-element pitches both in the case of detecting the presence of the edge and in the case of detecting the position of the edge. Furthermore, although, in the foregoing description, description has been made of an example in which the sensitivity is changed over by altering the accumulation time, the quantity of light may be changed over to change over the sensitivity. Moreover, although, in the foregoing description, description has been given of an example in which the present invention is applied to cases where the leading edge is detected, the present invention can also be applied to the detection of edges other than the leading frame edge.

In the above embodiment, description has been given of an example in which the negative film is fed unidirectionally from left to right. However, if the first light-receiving element area is disposed in a symmetrical position with the second light-receiving element area as a center, the negative film can be readily fed in the opposite direction without requiring any mechanical or optical change-over operation of the sensor, using the same algorithm as that described above. Thus, if an arrangement is provided such that the first light-receiving element areas are provided on both sides of the second light-receiving element area to allow the negative film to be fed in two directions, the present invention can be applied to implement a method such as the one disclose in Japanese Patent Laid-Open No. 91648/1986, in which the negative film is first fed by one frame, during which the image information of each frame is measured, and the negative film is returned one frame at a time while adjusting the amount of exposure in response to the image information so as to effect printing.

In addition, the method of detecting the frame edge in accordance with the present invention can be applied to the conventional procedures of handling negative films such as when printing is effected starting with a necessary frame after jumping unphotographed frames in elongated negative films, or, when, at the time of making a required number of reprints for specified frames in short negative films, necessary frames are searched and only the targeted frames are stopped.

What is claimed is:

1. A method of detecting a frame edge of a film fed by first and second groups of light-receiving element arrays, said first group of light-receiving element arrays being composed of at least one array extending perpendicular to an advancing direction of said film, said second group of light-receiving element arrays being composed of at least one array extending in the same direction as that of said first group of light-receiving element arrays in such a manner as to be parallel with said first group of light-receiving element arrays, comprising the steps of:
   (a) preliminarily detecting the presence of said frame edge by said first group of light-receiving element arrays; and
   (b) precision-detecting the position of said frame edge by said second group of light-receiving element arrays after preliminary detection of said frame edge.

2. A method of detecting a frame edge according to claim 1, wherein the presence of said frame edge is preliminarily detected by detecting the presence of a film edge by said first group of light-receiving element arrays in said step (a).

3. A method of detecting a frame edge, according to claim 2, wherein each of said first and second groups of light-receiving element arrays is constituted by at least one specific array of light-receiving elements extending perpendicular to a film-feeding direction of a two-dimensional image sensor.

4. A method of detecting a frame edge, according to claim 1, wherein each of said first and second groups of light-receiving element arrays is constituted by at least one specific array of light-receiving elements extending perpendicular to a film-feeding direction of a two-dimensional image sensor.

5. A method of detecting a frame edge, according to claim 1, wherein a film-feeding speed at the time of implementing said step (A) is greater than the film-feeding speed at the time of implementing said step (B).

6. A method of detecting a frame edge, according to claim 1, wherein the presence of said frame edge is preliminarily detected after detecting the presence of said film edge.

7. A method of detecting a frame edge, according to claim 1, wherein the presence of said frame edge is preliminarily detected when a point of change in which an output of said group of light-receiving element arrays reaches a value between a base density of said film and a fogging density thereof is detected.

8. A method of detecting a frame edge of a film fed by first and second groups of light-receiving element arrays, said first group of light-receiving element arrays being composed of at least one array extending perpendicular to an advancing direction of said film, said second group of light-receiving element arrays being composed of at least one array extending in the same direction as that of said first group of light-receiving element arrays in such a manner as to be parallel with said first group of light-receiving element arrays, comprising the steps of:
(a) preliminarily detecting the presence of said frame edge by said first group of light-receiving element arrays; and
(b) precision-detecting the position of said frame edge by said second group of light-receiving element arrays after preliminary detection of said frame edge, and wherein each of said first and second groups of light-receiving element arrays is constituted by at least one specific array of light-receiving elements extending perpendicular to a film-feeding direction of a two-dimensional image sensor, and wherein, in implementing said steps of (a) and (b) using an exposure-controlling image sensor of an automatic photographic printing apparatus as said two-dimensional image sensor, the sensitivity of said image sensor is made relatively lower than in the case of detecting image information of a frame to control the exposure using said image sensor.

9. A method of detecting a frame edge, according to claim 8, accumulation-type photoelectric conversion elements are used as light-receiving elements of said first and second groups of light-receiving element arrays, and the relative lowering of the sensitivity is effected by changing the dynamic range of said accumulation-type photoelectric conversion elements in such a manner that a quantity of light incident upon said accumulation-type photoelectric conversion elements is reduced.

10. A method of detecting a frame edge, according to claim 8, accumulation-type photoelectric conversion elements are used as light-receiving elements of said first and second groups of light-receiving element arrays, and the relative lowering of the sensitivity is effected by changing the dynamic range of said accumulation-type photoelectric conversion elements in such a manner that the accumulation time of said accumulation-type photoelectric conversion elements is shortened.

11. A method of detecting a frame edge of a film fed by first and second groups of light-receiving element arrays, said first group of light-receiving element arrays being composed of at least one array extending perpendicular to an advancing direction of said film, said second group of light-receiving element arrays being composed of at least one array extending in the same direction as that of said first group of light-receiving element arrays in such a manner as to be parallel with said first group of light-receiving element arrays, comprising the steps of:
(a) preliminarily detecting the presence of said frame edge by said first group of light-receiving element arrays; and
(b) precision-detecting the position of said frame edge by said second group of light-receiving element arrays after preliminary detection of said frame edge; wherein the presence of said frame edge is preliminarily detected by detecting the presence of a film edge by said first group of light-receiving element arrays in step (a), wherein each of said first and second groups of light-receiving element arrays is constituted by at least one specific array of light-receiving elements extending perpendicular to a film-feeding direction of a two-dimensional image sensor, and wherein, in implementing said steps of (a) and (b) using an exposure-controlling image sensor of an automatic photographic printing apparatus as said two-dimensional image sensor, the sensitivity of said image sensor is made relatively lower than in the case of detecting image information of a frame to control the exposure using said image sensor.

12. A method of detecting a frame edge, according to claim 11, accumulation-type photoelectric conversion elements are used as light-receiving elements of said first and second groups of light-receiving element arrays, and the relative lowering of the sensitivity is effected by changing the dynamic range of said accumulation-type photoelectric conversion elements in such a manner that the accumulation time of said accumulation-type photoelectric conversion elements is shortened.

13. A method of detecting a frame edge, according to claim 11, accumulation-type photoelectric conversion elements are used as light-receiving elements of said first and second groups of light-receiving element arrays, and the relative lowering of the sensitivity is effected by changing the dynamic range of said accumulation-type photoelectric conversion elements in such a manner that a quantity of light incident upon said accumulation-type photoelectric conversion elements is reduced.

14. A method of detecting a frame edge of a film to position said film fed by a first group of light-receiving element arrays constituted by at least one array extending perpendicular to an advancing direction of said film and a second group of light-receiving element arrays constituted by at least one array disposed parallel with said first group of light-receiving element arrays downstream of the advancing direction of said film at a predetermined distance from said first group of light-receiving element arrays, comprising the steps of:

(a) preliminarily detecting the presence of said frame edge by said first group of light-receiving element arrays; and (b) precisely detecting the position of said frame edge by said second group of light-receiving element arrays after said frame edge has been preliminarily detected.

15. A method of detecting a frame edge according to claim 14, wherein the presence of said frame edge is preliminarily detected by detecting the presence of a film edge by said first group of light-receiving element arrays in said step (a).

16. A method of detecting a frame edge, according to claim 14, wherein a film-feeding speed at the time of implementing said step (A) is greater than the film-feeding speed at the time of implementing said step (B).

17. A method of detecting a frame edge, according to claim 14, wherein the presence of said frame edge is preliminarily detected after detecting the presence of said film edge.

18. A method of detecting a frame edge, according to claim 14, wherein the presence of said frame edge is preliminarily detected when a point of change in which an output of said group of light-receiving element arrays reaches a value between a base density of said film and a fogging density thereof is detected.

* * * * *